(12) United States Patent
Takano

(10) Patent No.: US 10,462,479 B2
(45) Date of Patent: Oct. 29, 2019

(54) MOTION PICTURE ENCODING DEVICE, MOTION PICTURE ENCODING METHOD, AND STORAGE MEDIUM STORING MOTION PICTURE ENCODING PROGRAM

(71) Applicant: NEC Corporation, Tokyo (JP)

(72) Inventor: Fumiyo Takano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/742,964

(22) PCT Filed: Jul. 8, 2016

(86) PCT No.: PCT/JP2016/003258
§ 371 (c)(1),
(2) Date: Jan. 9, 2018

(87) PCT Pub. No.: WO2017/010073
PCT Pub. Date: Jan. 19, 2017

(65) Prior Publication Data
US 2018/0227592 A1    Aug. 9, 2018

(30) Foreign Application Priority Data

Jul. 10, 2015   (JP) .................................. 2015-138655

(51) Int. Cl.
*H04B 1/66* (2006.01)
*H04N 7/12* (2006.01)
(Continued)

(52) U.S. Cl.
CPC ........... *H04N 19/52* (2014.11); *H04N 19/105* (2014.11); *H04N 19/176* (2014.11);
(Continued)

(58) Field of Classification Search
CPC ................................................... H04N 19/513
See application file for complete search history.

(56) References Cited

U.S. PATENT DOCUMENTS

2007/0286281 A1   12/2007   Tsuchiya et al.
2013/0003850 A1   1/2013   Sugio et al.
(Continued)

FOREIGN PATENT DOCUMENTS

JP   2005-244503 A   9/2005
JP   2012-175424 A   9/2012
(Continued)

OTHER PUBLICATIONS

ITU-T Recommendation H.265, "High efficiency video coding," Apr. 2013, 317 pages.
(Continued)

*Primary Examiner* — Tat C Chio
*Assistant Examiner* — Fabio S Lima
(74) *Attorney, Agent, or Firm* — Sughrue Mion, PLLC

(57) ABSTRACT

Provided is a motion picture encoding device that is capable of processing a large number of tasks in a parallel manner without reducing encoding efficiency. A motion picture encoding device 10 is provided with a motion vector determining unit 11 that determines the motion vector of a block to be encoded used for a motion compensation prediction from the motion vectors of adjacent blocks contained in a reference region among blocks adjacent to the block to be encoded contained in the reference region that constructs an image.

6 Claims, 19 Drawing Sheets

(51) Int. Cl.
- *H04N 11/02* (2006.01)
- *H04N 11/04* (2006.01)
- *H04N 19/52* (2014.01)
- *H04N 19/105* (2014.01)
- *H04N 19/176* (2014.01)
- *H04N 19/46* (2014.01)
- *H04N 19/436* (2014.01)
- *H04N 19/147* (2014.01)

(52) U.S. Cl.
CPC .......... *H04N 19/436* (2014.11); *H04N 19/46* (2014.11); *H04N 19/147* (2014.11)

(56) References Cited

U.S. PATENT DOCUMENTS

| | | | |
|---|---|---|---|
| 2013/0163669 A1* | 6/2013 | Lim | H04N 19/573 375/240.15 |
| 2013/0208799 A1* | 8/2013 | Srinivasamurthy | H04N 19/119 375/240.16 |
| 2013/0322545 A1 | 12/2013 | Kondow | |
| 2014/0301467 A1* | 10/2014 | Thirumalai | H04N 19/597 375/240.16 |
| 2014/0376638 A1 | 12/2014 | Nakamura et al. | |
| 2015/0146780 A1* | 5/2015 | Miyoshi | H04N 19/593 375/240.12 |
| 2015/0350674 A1* | 12/2015 | Laroche | H04N 19/593 375/240.16 |
| 2017/0223376 A1* | 8/2017 | Nakamura | H04N 19/463 |
| 2017/0302936 A1* | 10/2017 | Li | H04N 19/176 |

FOREIGN PATENT DOCUMENTS

| | | |
|---|---|---|
| JP | 2012-191512 A | 10/2012 |
| JP | 2013-121167 A | 6/2013 |
| JP | 2013-236367 A | 11/2013 |
| JP | 2014-533059 A | 12/2014 |
| WO | 2013/001818 A1 | 1/2013 |
| WO | 2015/083300 A1 | 6/2015 |

OTHER PUBLICATIONS

Ngai-Man Cheung, et al., "Video Coding on Multicore Graphics Processors," IEEE Signal Processing Magazine, Mar. 2010, pp. 79-89, vol. 27, No. 2.

Written Opinion of the International Searching Authority of PCT/JP2016/003258 dated Aug. 9, 2016.

International Search Report of PCT/JP2016/003258 dated Aug. 9, 2016.

* cited by examiner

Fig.20
RELATED ART
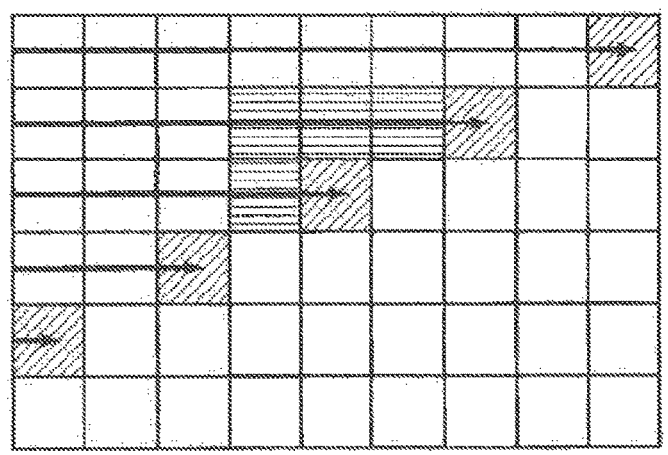
 : REFERENCE BLOCK
 : ENCODING TARGET BLOCK
 : PROCESSING DIRECTION

MOTION PICTURE ENCODING DEVICE, MOTION PICTURE ENCODING METHOD, AND STORAGE MEDIUM STORING MOTION PICTURE ENCODING PROGRAM

CROSS REFERENCE TO RELATED APPLICATIONS

This application is a National Stage of International Application No. PCT/JP2016/003258 filed Jul. 8, 2016, claiming priority based on Japanese Patent Application No. 2015-138655 filed Jul. 10, 2015, the contents of all of which are incorporated herein by reference in their entirety.

TECHNICAL FIELD

The present invention relates to a motion picture encoding device, a motion picture encoding method, and a motion picture encoding program, and in particular, to a motion picture encoding device, a motion picture encoding method, and a motion picture encoding program that operate at high efficiency in parallel processing without decreasing encoding efficiency.

BACKGROUND ART

Demands for improvement in resolution of motion pictures are increasing. Along with the demands, encoding technique is also advancing. As examples of encoding technique, MPEG-2, H.264/MPEG-4 AVC (hereinafter, referred to as H.264), and H.265/HEVC (hereinafter, referred to as H.265) are listed in order of development. A newly developed encoding technique is improved in compression efficiency more than a previously developed encoding technique. Encoding methods used in the above-described encoding techniques compress information at higher encoding efficiency by using a motion compensation prediction between frames.

NPL 1 describes a content of processing based on the standards of H.265. In processing of motion picture encoding based on the standards of H.265, an image (picture) is divided into block units referred to as coding tree units (CTUs), and the CTUs generated by division are processed in raster-scan order (i.e. arrangement order from an upper left to a lower right in a screen). A maximum size of the CTUs is 64×64 pixels.

The CTUs are further quad-tree-divided into block units referred to as coding units (CUs). In motion picture encoding processing conforming to the standards of H.265, encoding processing is executed for each CU.

A CTU includes coding tree blocks (CTBs) of a brightness signal and a color-difference signal. A CU includes coding blocks (CBs) of a brightness signal and a color-difference signal.

A motion compensation prediction that compresses inter-frame information is a technique for compressing motion picture information by using the following method. In the motion compensation prediction, an image of the reference frame is corrected by using motion information between an encoding target frame and an encoded reference frame. Then, only difference information between the corrected image (i.e. a prediction image) and a current image of the encoding target frame and information representing a motion between the frames are encoded. The motion between the frames is represented by a motion vector representing a movement.

In motion picture encoding, it is important to determine prediction encoding information such as motion information in such a way as to minimize an amount of information to be encoded, while suppressing an amount of noise generated in a decode image. In a common motion picture encoding method, a technique referred to as RD optimization that determines prediction encoding information in such a way as to satisfy the condition described above is widely used.

In the RD optimization, a rate distortion cost represented by $J=D+\lambda R$ is calculated for each of a large number of motion vector candidates. D is a distortion amount generated in a difference image, R is an encode amount generated in encoding of motion information, and $\lambda$ is a weight coefficient depending on complexity of an image and the like. A motion vector candidate having a rate distortion cost of a minimum value among the calculated rate distortion costs is employed as a motion vector.

In a motion picture, pieces of motion information of blocks (i.e. neighborhood blocks) located in a spatial neighborhood or pieces of motion information of blocks located in a temporal neighborhood have higher correlativity, compared with pieces of motion information of common blocks. In H.265, adaptive motion vector prediction (AMVP) in which a prediction value (e.g. a prediction vector) of a motion vector is adaptively selected from motion vectors of neighborhood blocks and a merge mode in which motion information is copied from motion information of a neighborhood block is used. Usage of AMVP and the merge mode reduces an encode amount R generated in encoding of motion information.

Spatial neighborhood blocks that are blocks, among neighborhood blocks, located in a spatial neighborhood of an encoding target block are illustrated in FIG. 16. FIG. 16 is an illustrative diagram illustrating spatial neighborhood blocks of an encoding target block.

The spatial neighborhood blocks are specifically blocks A, B, C, D, and E illustrated in FIG. 16. The neighborhood block also includes a temporal neighborhood block that is a block belonging to a temporal neighborhood frame of a frame to which an encoding target block belongs and being located at the same position as the encoding target block.

In the merge mode, only indexes of a list of motion information of neighborhood blocks is encoded, and the encoded indexes is transferred. An encoder can voluntarily select a block used in the merge mode or AMVP from the list of the neighborhood blocks. Motion information of the neighborhood blocks obtained in the encoder is the same as the information obtained in a decoder. In other words, in the merge mode, transfer of an encoded index is equivalent to transfer of motion information. In the merge mode, an encode amount generated in encoding of motion information is further reduced.

As described in NPL 1, in order to reduce an encode amount generated in encoding of motion information, an index in a merge mode is set not according to information fixed for each position of a block but according to an encoding mode of a neighborhood block. The merge mode is a technique that produces a large effect of reducing an encode amount. In order to achieve higher encoding efficiency, it is important to use a merge mode appropriately.

FIG. 17 is a block diagram illustrating a configuration example of a common motion picture encoding device. A motion picture encoding device 1000 illustrated in FIG. 17 includes a transformation/quantization unit 1100, a subtraction unit 1200, an encoding unit 1300, an inverse-transformation/inverse-quantization unit 1400, an addition unit 1210, a loop filter 1500, a frame buffer 1600, a prediction encoding information determining unit 1700, an in-screen predicting unit 1800, and a motion compensation predicting unit 1900.

The subtraction unit 1200 subtracts a prediction image that is input from the in-screen predicting unit 1800 or the motion compensation predicting unit 1900 from an image signal that is input from an outside. The subtraction unit 1200 sets an image obtained by subtraction of the prediction image as a difference image, and inputs the difference image to the transformation/quantization unit 1100.

The transformation/quantization unit 1100 performs orthogonal transformation on the input difference image, and quantizes generated transformation coefficients. The transformation/quantization unit 1100 inputs the quantized transformation coefficients to the encoding unit 1300.

The encoding unit 1300 executes lossless encoding such as variable-length encoding or arithmetic encoding for the input quantized transformation coefficients, and generates a bit stream. The generated bit stream is output from the motion picture encoding device 1000.

The quantized transformation coefficient is further input to the inverse-transformation/inverse-quantization unit 1400. The inverse-transformation/inverse-quantization unit 1400 executes inverse-quantization of the input quantized transformation coefficient, and executes inverse orthogonal transformation for the generated transformation coefficients. The inverse-transformation/inverse-quantization unit 1400 inputs information obtained by the inverse orthogonal transformation to the addition unit 1210.

The addition unit 1210 adds the information obtained by the inverse orthogonal transformation and the prediction image and generates a reconstruction image. The addition unit 1210 inputs the generated reconstruction image to the loop filter 1500.

The loop filter 1500 eliminates block distortion of the input reconstruction image. The loop filter 1500 accumulates the reconstruction image from which the block distortion is eliminated in the frame buffer 1600. The reconstruction image accumulated in the frame buffer 1600 is used as a reference image of another frame.

The prediction encoding information determining unit 1700 determines, by using the input image, the reconstruction image, and the reference image of another frame, which prediction mode of an in-screen prediction mode and a motion compensation prediction mode is to be used for predicting an input image. Further, the prediction encoding information determining unit 1700 determines prediction encoding information for the determined prediction mode.

A reconstruction image from which block distortion is not eliminated is input to the in-screen predicting unit 1800. The in-screen predicting unit 1800 executes in-screen prediction processing for the input reconstruction image and outputs an in-screen prediction image generated in the in-screen prediction processing.

The motion compensation predicting unit 1900 detects a position change of a corresponding image block of the input image with respect to an image block of the reconstruction image accumulated on the frame buffer 1600. The motion compensation predicting unit 1900 then obtains a motion vector equivalent to the detected position change. The motion compensation predicting unit 1900 executes motion compensation prediction processing by using the obtained motion vector and outputs a motion compensation prediction image generated in the motion compensation prediction processing.

The in-screen predicting unit 1800 and the motion compensation predicting unit 1900 each generate prediction images according to the determined content of the prediction encoding information determining unit 1700.

Next, a configuration example of the prediction encoding information determining unit 1700 that determines prediction encoding information including motion information is illustrated in FIG. 18. FIG. 18 is a block diagram illustrating a configuration example of a common prediction encoding information determining unit. The prediction encoding information determining unit 1700 illustrated in FIG. 18 includes a motion vector search unit 1710, a merge vector/merge index determining unit 1720, an in-screen prediction mode determining unit 1730, a prediction encoding mode determining unit 1740, and a prediction information buffer 1750.

The motion vector search unit 1710 includes a function of determining a tentative motion vector having a minimum cost from among a large number of motion vector candidates in a search range by executing block matching or the like. The block matching is a method of searching a motion vector having a minimum cost in a reference image by using a cost function such as sum of absolute difference (SAD).

The merge vector/merge index determining unit 1720 includes a function of determining a merge vector having a minimum cost from among a plurality of merge vector candidates derived from motion vectors of neighborhood blocks by executing block matching or the like. The merge vector/merge index determining unit 1720 includes a function of determining a merge index corresponding to the determined merge vector having a minimum cost.

The in-screen prediction mode determining unit 1730 includes a function of determining a mode having a minimum cost among a plurality of in-screen prediction modes.

The prediction encoding mode determining unit 1740 receives a tentative motion vector and a cost for the tentative motion vector output from the motion vector search unit 1710. The prediction encoding mode determining unit 1740 further receives merge information and a cost for the merge information output from the merge vector/merge index determining unit 1720. The merge information includes a merge vector and a merge index.

The prediction encoding mode determining unit 1740 receives in-screen mode information and a cost for the in-screen mode information output from the in-screen prediction mode determining unit 1730. The prediction encoding mode determining unit 1740 determines, on the basis of the input information, which prediction mode of a prediction vector mode in which a tentative motion vector is used, a merge mode, and an in-screen prediction mode is used as a prediction encoding mode for an encoding target block. The prediction vector mode and the merge mode are included in a motion compensation prediction mode.

The prediction information buffer 1750 includes a function of storing prediction encoding information such as determined motion information and the like. The prediction information buffer 1750 receives the determined prediction encoding information from the prediction encoding mode determining unit 1740.

A configuration example of the merge vector/merge index determining unit 1720 is illustrated in FIG. 19. FIG. 19 is a block diagram illustrating a configuration example of a common merge vector/merge index determining unit. The merge vector/merge index determining unit 1720 illustrated in FIG. 19 includes a merge vector candidate list generating unit 1721 and a merge vector/index selecting unit 1722.

The merge vector candidate list generating unit 1721 includes a function of generating a list of motion vectors that are candidates of a merge vector from stored motion vectors of neighborhood blocks in a motion information buffer (not illustrated).

The merge vector/index selecting unit 1722 calculates, on the basis of a current image and a reference image, an evaluation cost with respect to each merge vector candidate included in the list generated by the merge vector candidate list generating unit 1721. The merge vector/index selecting unit 1722 selects a merge vector for which a minimum calculated evaluation cost is calculated, and selects an index of the selected merge vector. The merge vector/index selecting unit 1722 outputs merge information including the selected merge vector and merge index and an evaluation cost for the selected merge vector.

A large computation amount is concerned with motion estimation processing in which costs for a large number of vectors are compared. In other words, it is necessary to accelerate motion estimation processing. It is highly possible to achieve acceleration of processing, for example, by causing a many core processor such as a graphic processing unit (GPU) including a large number of processor cores to execute motion estimation processing in parallel.

As one common parallel processing technique in a motion picture encoding technique, there is wavefront parallel processing (WPP). A specific example of WPP is described in NPL 2.

FIG. 20 is an illustrative diagram illustrating an example of WPP. As illustrated in FIG. 20, when a motion picture encoding device encodes image blocks of rows in parallel by using WPP, an encoding target block of a specific row is a block shifted to a two-block left side from an encoding target block of a one-upper row of the specific row. Therefore, when the encoding target block of the specific row is encoded, the motion picture encoding device can refer to processing results of a left block and an upper-right block.

PTL 1 describes an encoding processing device that divides an image into a plurality of regions, encodes a block in contact with a border of a region by using only information of blocks in the region to which the block in contact with the border belong, and thereby executes encoding processing in parallel for each of the regions.

The standards of H.265 described in NPL 1 adopts a function referred to as a parallel merge that improves parallelism of encoding processing. When the parallel merge is used, a CTU is divided into a plurality of square regions referred to as motion estimation regions (MERs).

In the parallel merge, when a block belonging to an MER is encoded, motion information of blocks belonging to the same MER is designated as motion information that is not referred to. Consequently, there is no dependence relation between the blocks, and therefore the blocks are processed in parallel. Therefore, when an MER is specified as a 16×16 size, an encoding device can encode in parallel, for example, four 8×8 size blocks or sixteen 4×4 size blocks belonging to the same MER.

PTL 2 and PTL 3 describe techniques in which when blocks belonging to a CU is encoded, reference to another block belonging to the same CU is prohibited, and thereby blocks belonging to the same CU are processed in parallel.

CITATION LIST

Patent Literature

PTL 1: Japanese Unexamined Patent Application Publication No. 2012-175424

PTL 2: Japanese Unexamined Patent Application Publication No. 2013-121167

PTL 3: Japanese Translation of PCT International Application Publication No. 2014-533059

Non Patent Literature

NPL 1: ITU-T Recommendation H.265 "High efficiency video coding," April 2013

NPL 2: Nagai-Man Cheung, et al. "Video coding on multicore graphics processors," IEEE Signal Processing Magazine, vol. 27, No. 2 (2010), pp. 79-89

SUMMARY OF INVENTION

Technical Problem

In order to sufficiently operate each of a plurality of processor cores in parallel processing, it is important to prepare a large number of tasks processable in parallel.

The task described above corresponds to encoding processing of blocks in WPP and parallel processing as in the techniques described in PTL 2 and PTL 3. In parallel processing executed by the encoding processing device described in PTL 1, the task described above corresponds to encoding processing of regions generated by division.

In order to operate all of a plurality of processor cores at the same time, tasks of at least a processor core number are needed. When processing amounts for processing of the tasks are different, processing amounts processed by processors have a greater tendency to be equal as the number of tasks is larger.

The reason is that when, for example, there are tasks of only a processor core number, a processing amount processed by each processor is a processing amount for processing of an allocated task. However, when the number of tasks is equal to or more than a processor core number, an encoding device can allocate tasks to processor cores after combining tasks on the basis of processing amounts, e.g. combining a task having a large processing amount and a task having a small processing amount for processing, and combining tasks each having similar processing amounts for processing.

In other words, when a many core processor such as a GPU including several thousand or more processor cores is caused to execute parallel processing, a large number of tasks proces sable in parallel is required to be prepared.

As described above, in motion estimation processing, motion information is compressed on the basis of spatial correlativity, and therefore a spatial data dependence relation between blocks is used. Therefore, in motion estimation processing, there is a problem that it is not easy to execute encoding processing of a large number of blocks, i.e. to process a large number of tasks in parallel.

Even in WPP, tasks of at most the number of rows of blocks are processed in parallel. Even when an image of a resolution of 4K (3840×2160) is encoded, the maximum number of tasks is 34 (>33.75=2160/64).

When a parallel merge is used, a maximum size of an MER is the 64×4 size that is the same as a maximum size of a CTU. The minimum block size in a CTU is the 4×4 size. Therefore, even when a parallel merge is used, the number of tasks proces sable in parallel is 64×64/4×4=256 at most. In other words, in order to operate sufficiently a many core processor having a capability of processing several thousand tasks in parallel, a task number is insufficient.

The maximum PU number in a CU is 4. In other words, even when the techniques described in PTL 2 and PTL 3 is used, the number of tasks processable in parallel is 4 at most, and therefore a task number is insufficient to sufficiently operate a many core processor. A large number of tasks are caused to be processable in parallel, and thereby a many core processor is expected to execute encoding processing at high speed.

In the encoding processing device described in PTL 1, there is a problem that when an image is divided into a large number of regions (i.e. when tasks processable in parallel increase), blocks to which a merge mode is not applied increase and encoding efficiency decreases.

As described above, in order to achieve higher encoding efficiency, it is important to use a merge mode appropriately. A method for increasing tasks proces sable in parallel in a merge mode is not described in any of PTL 1 to 3 and NPL 1 to 2.

A method for increasing tasks proces sable in parallel in a merge mode will be considered. As described above, the merge vector candidate list generating unit 1721 generates a list of motion vectors that are candidates of a merge vector from motion vectors of neighborhood blocks. When the list is generated, the merge vector candidate list generating unit 1721 refers to both a block in a specific region to which an encoding target block belongs and a block outside the specific region.

When a block outside the specific region is referred to, prediction encoding information determination processing for a frame to which the block outside the specific region belongs needs to have been completed. In other words, there is a dependence relation among pieces of prediction encoding information determination processing for frames and the pieces of processing are not executed in parallel, and therefore it is not possible to increase tasks proces sable in parallel.

Therefore, the present invention is intended to provide a motion picture encoding device, a motion picture encoding method, and a motion picture encoding program capable of solving the above-described problems and of processing a large number of tasks in parallel without decreasing encoding efficiency.

Solution to Problem

A motion picture encoding device according to the present invention includes motion vector determining means for determining a motion vector of an encoding target block among motion vectors of adjacent blocks included in a reference region including an encoding target block, the motion vector being used for motion compensation prediction, the adjacent blocks being blocks adjacent to the encoding target block, the reference region being included in an image.

A motion picture encoding method according to the present invention includes determining a motion vector of an encoding target block among motion vectors of adjacent blocks included in a reference region including an encoding target block, the motion vector being used for motion compensation prediction, the adjacent blocks being blocks adjacent to the encoding target block, the reference region being included in an image.

A storage medium according to the present invention stores a motion picture encoding program for causing a computer to execute determination processing of determining a motion vector of an encoding target block among motion vectors of adjacent blocks included in a reference region including an encoding target block, the motion vector being used for motion compensation prediction, the adjacent blocks being blocks adjacent to the encoding target block, the reference region being included in an image. The present invention is achieved also by the motion picture encoding program.

Advantageous Effects of Invention

According to the present invention, a large number of tasks can be processed in parallel without decreasing encoding efficiency.

BRIEF DESCRIPTION OF DRAWINGS

FIG. 20 is an illustrative diagram illustrating an example of WPP.

DESCRIPTION OF EMBODIMENTS

First Example Embodiment
[Description of Configurations]

Figure 1:
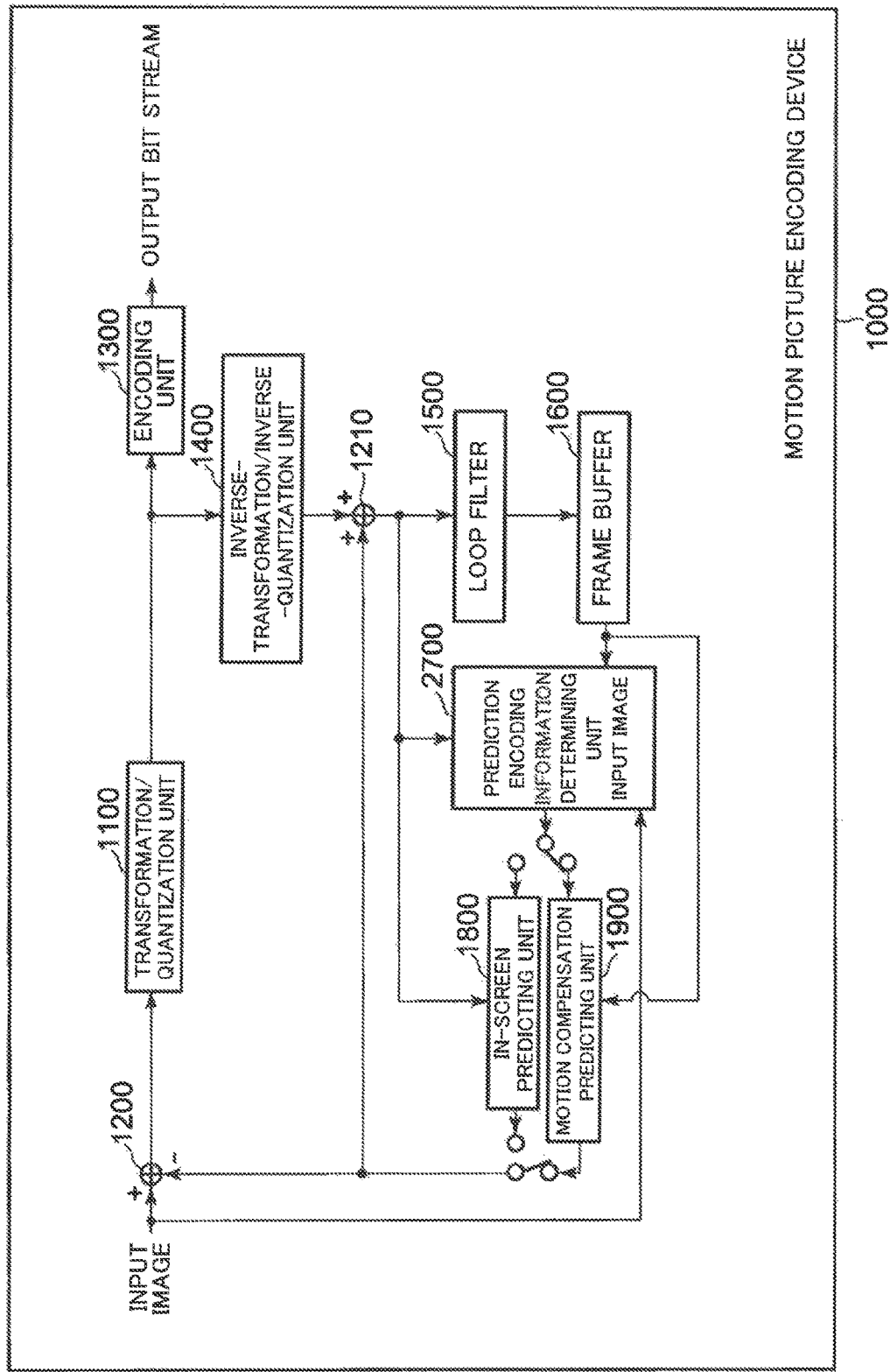
FIG. 1 is a block diagram illustrating a configuration example of a first example embodiment of a motion picture encoding device according to the present invention.

Example embodiments of the present invention will be described with reference to the accompanying drawings. FIG. 1 is a block diagram illustrating a configuration example of a first example embodiment of a motion picture encoding device according to the present invention.

Figure 17:
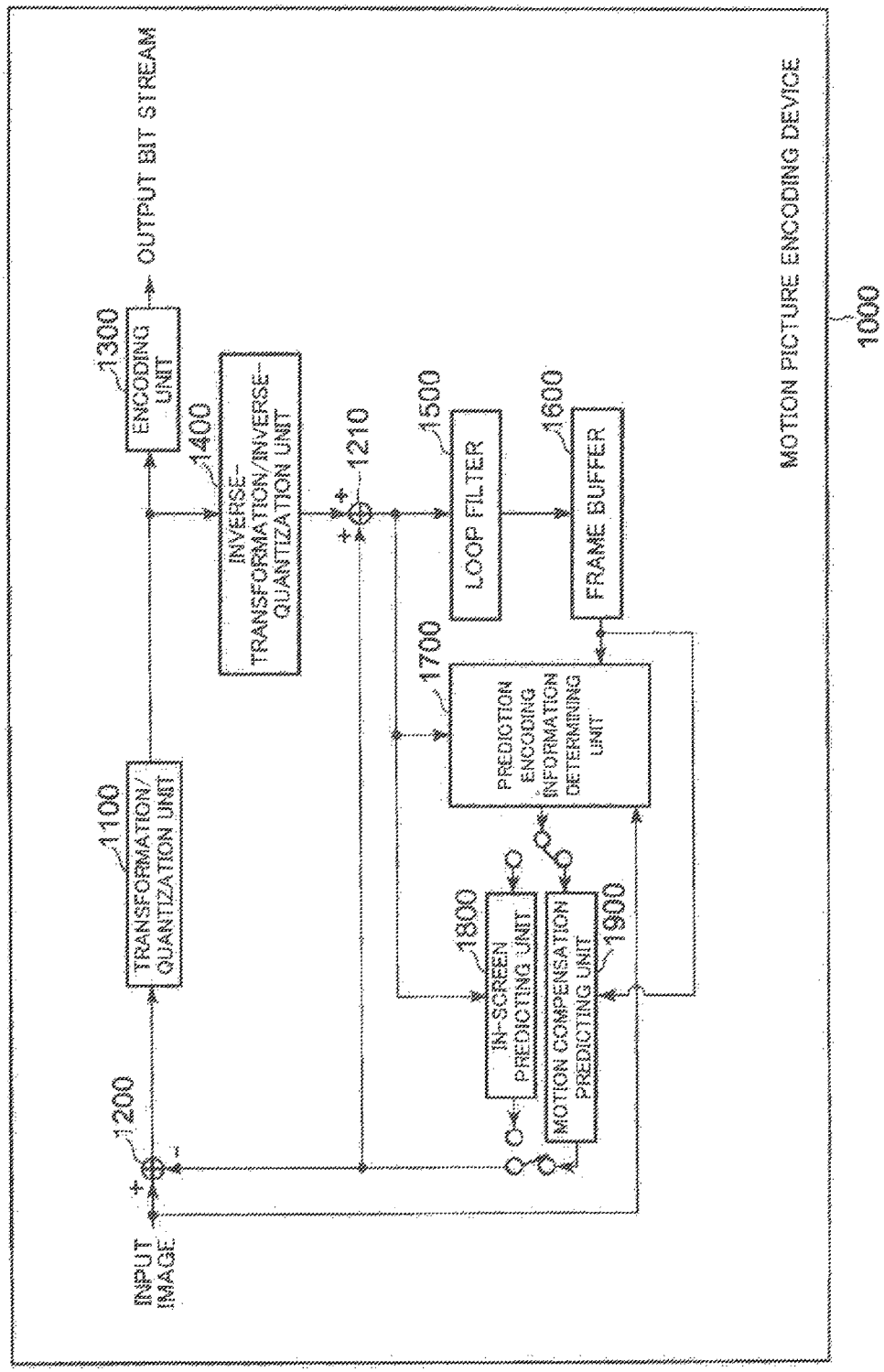
FIG. 17 is a block diagram illustrating a configuration example of a common motion picture encoding device.
Figure 18:
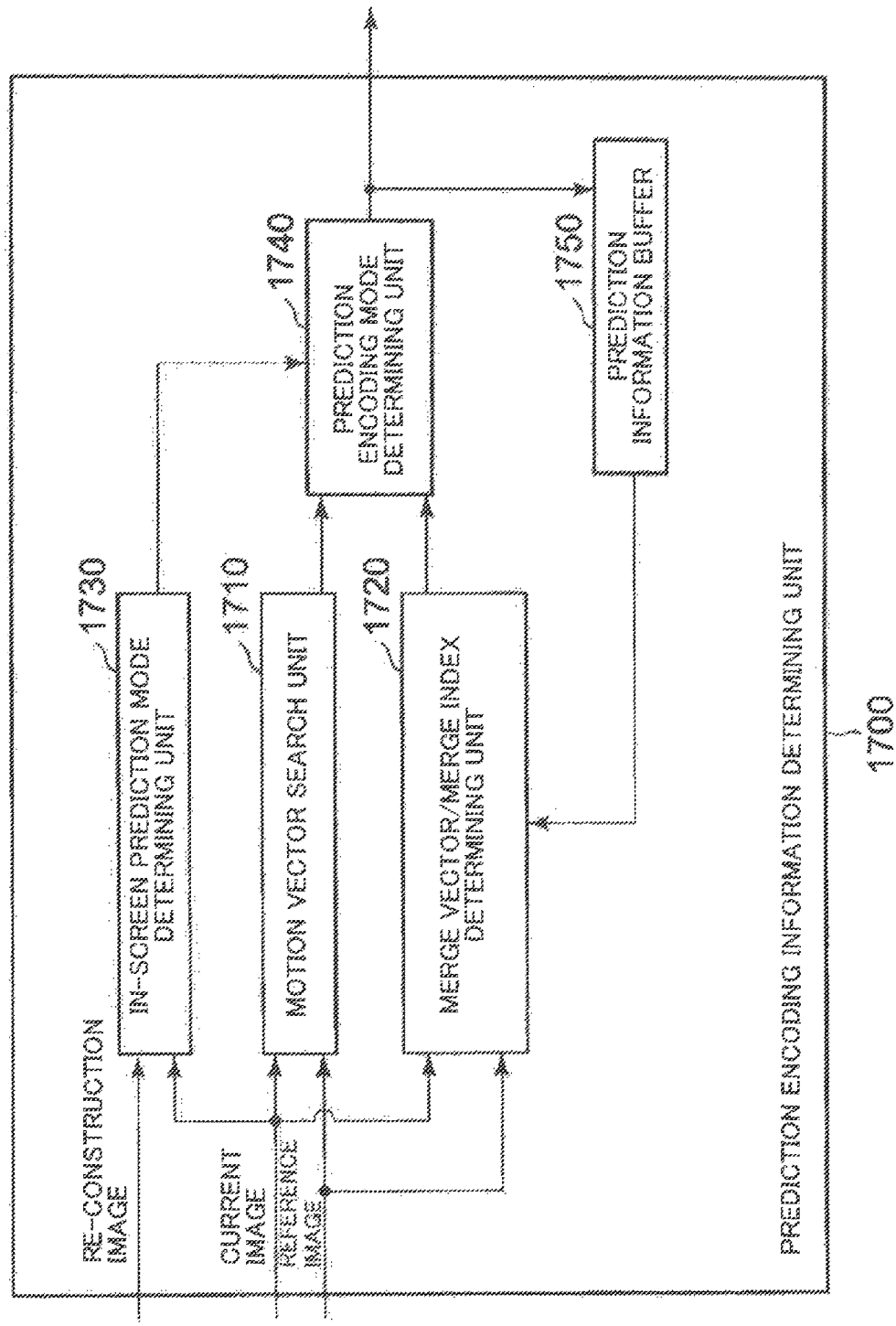
FIG. 18 is a block diagram illustrating a configuration example of a common prediction encoding information determining unit.
Figure 19:
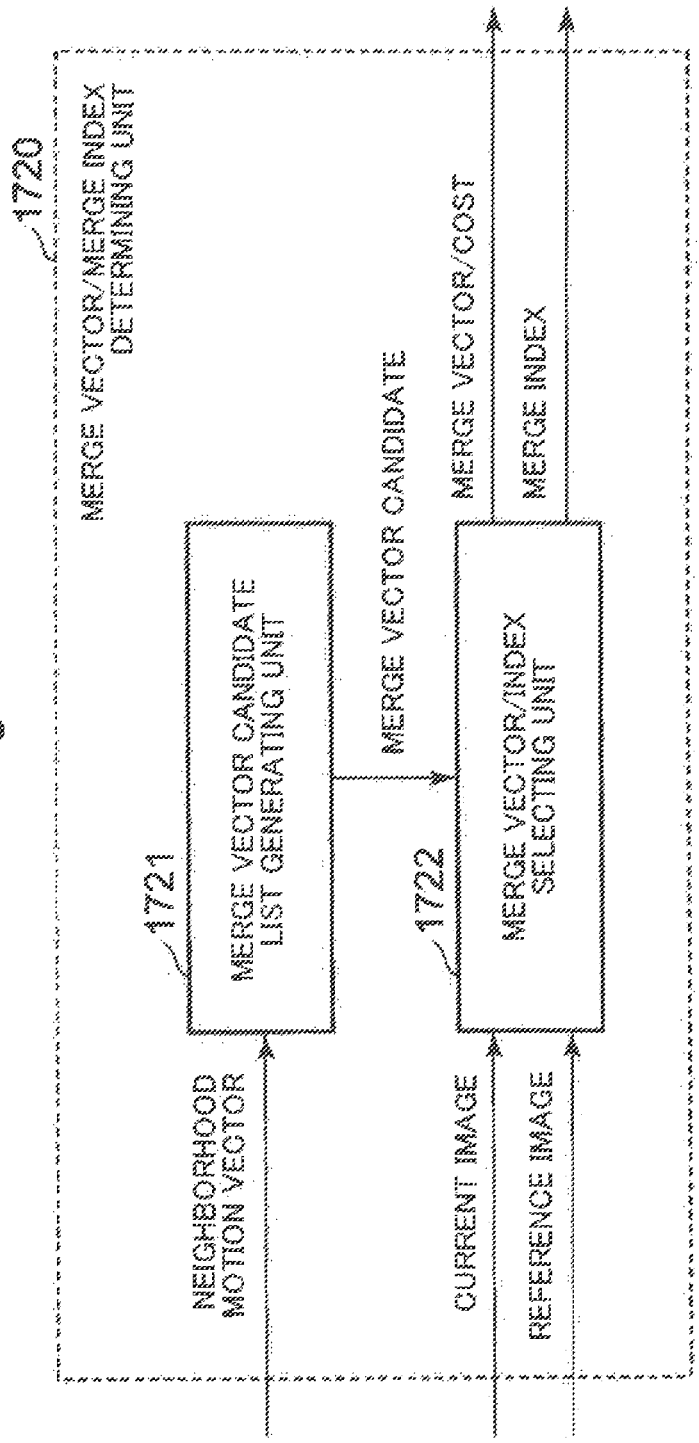
FIG. 19 is a block diagram illustrating a configuration example of a common merge vector/merge index determining unit.

As illustrated in FIG. 1, a motion picture encoding device 1000 of the present example embodiment is different from the motion picture encoding device 1000 illustrated in FIG. 17 in a point that a prediction encoding information determining unit 2700 is included instead of the prediction encoding information determining unit 1700. A configuration of the motion picture encoding device 1000 illustrated in FIG. 1 except the prediction encoding information determining unit 2700 is similar to the configuration of the motion picture encoding device 1000 illustrated in FIG. 17.

The prediction encoding information determining unit 2700 of the present example embodiment does not refer to a block outside a specific region, in a frame (i.e. a screen), to which an encoding target block belongs when generating a merge vector candidate list.

The specific region in the present example embodiment is a CTB including an encoding target block. In other words, the prediction encoding information determining unit 2700 does not refer to a block that does not belong to a CTB to which an encoding target block belongs when generating a merge vector candidate list. The specific region may be a region other than the CTB.

Figure 2:
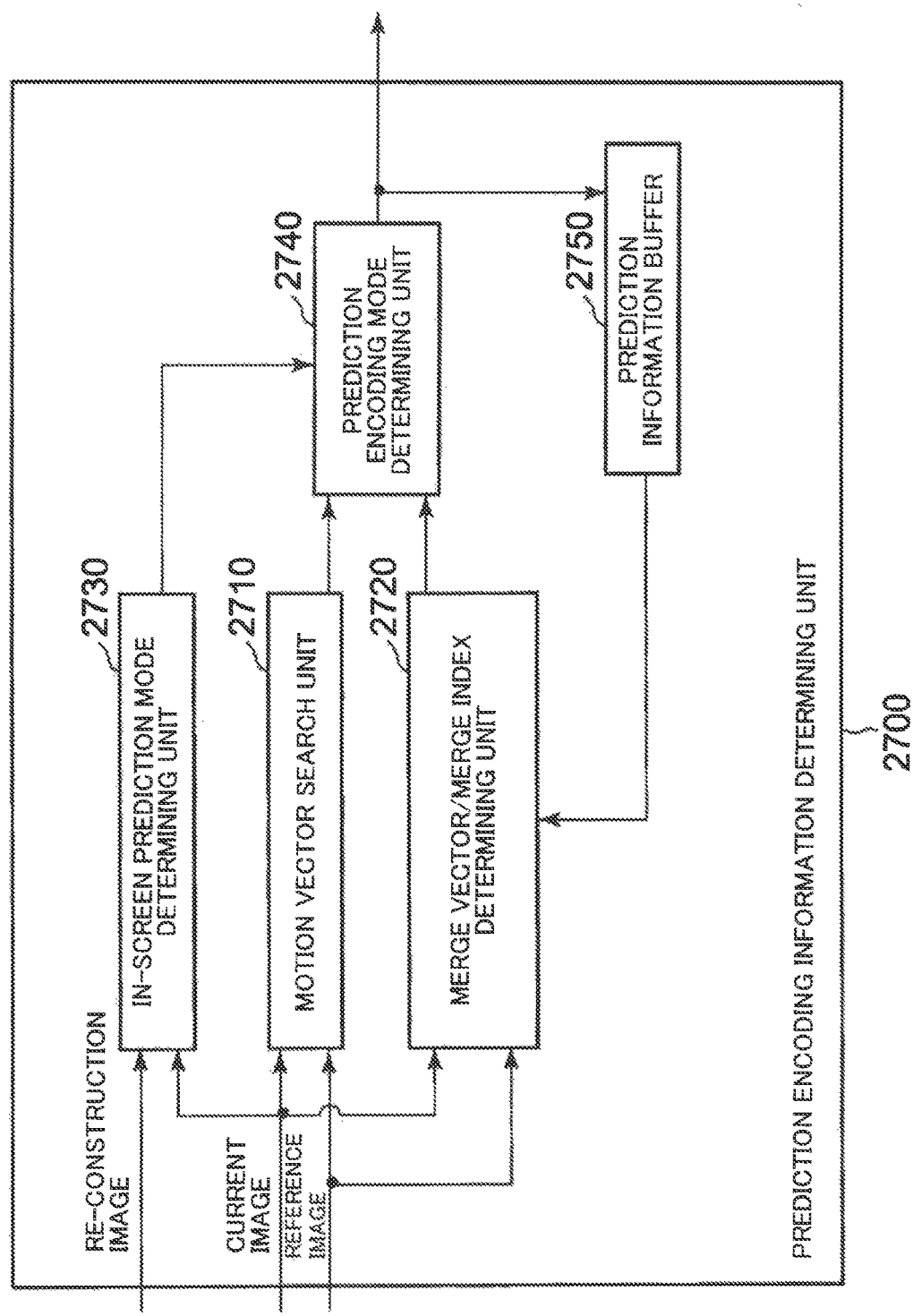
FIG. 2 is a block diagram illustrating a configuration example of a prediction encoding information determining unit 2700 of the first example embodiment.

A configuration of the prediction encoding information determining unit 2700 of the present example embodiment will be described with reference to drawings. FIG. 2 is a block diagram illustrating a configuration example of the prediction encoding information determining unit 2700 of the first example embodiment.

The prediction encoding information determining unit 2700 illustrated in FIG. 2 includes a motion vector search unit 2710, a merge vector/merge index determining unit 2720, an in-screen prediction mode determining unit 2730, a prediction encoding mode determining unit 2740, and a prediction information buffer 2750.

The motion vector search unit 2710 includes a function of determining a tentative motion vector having a minimum cost from among a large number of motion vector candidates in a search range by executing block matching or the like.

The merge vector/merge index determining unit 2720 includes a function of determining a merge vector having a minimum cost from among a plurality of merge vector candidates derived from motion vectors of neighborhood blocks by executing block matching or the like. The merge vector/merge index determining unit 2720 further includes a function of determining a merge index related to the determined merge vector having a minimum cost.

The in-screen prediction mode determining unit 2730 includes a function of determining a mode having a minimum cost from among a plurality of in-screen prediction modes.

The prediction encoding mode determining unit 2740 receives a tentative motion vector and a cost for the tentative motion vector output from the motion vector search unit 2710. The prediction encoding mode determining unit 2740 receives merge information and a cost for the merge information output from the merge vector/merge index determining unit 2720. The prediction encoding mode determining unit 2740 receives in-screen mode information and a cost for the in-screen mode information output from the in-screen prediction mode determining unit 2730.

The prediction encoding mode determining unit 2740 determines, on the basis of the input information, which prediction mode of a prediction vector mode in which a tentative motion vector is used, a merge mode, and an in-screen prediction mode is used as a prediction encoding mode for an encoding target block.

The prediction information buffer 2750 includes a function of storing determined prediction encoding information such as motion information. The prediction information buffer 2750 receives determined prediction encoding information from the prediction encoding mode determining unit 2740.

Figure 3:
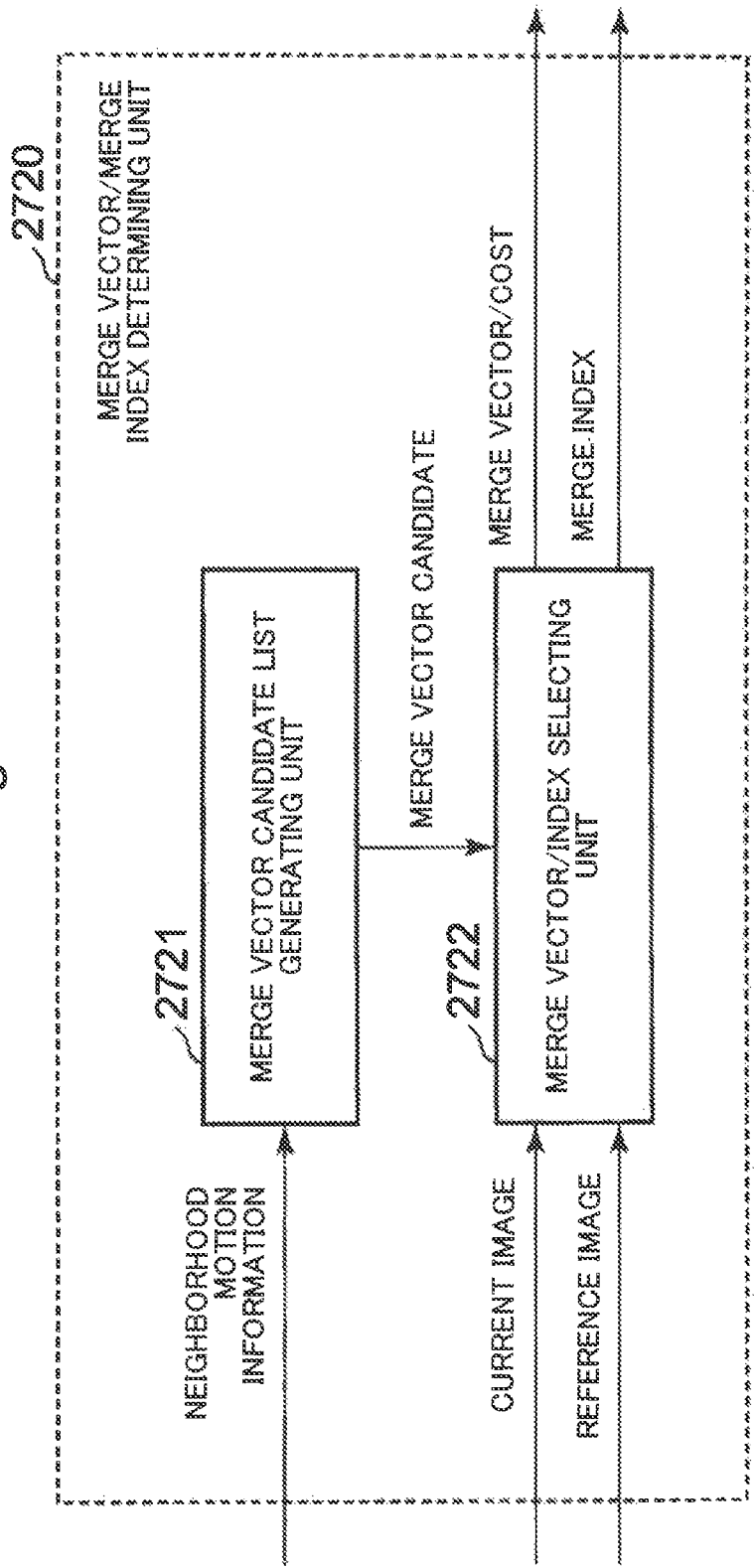
FIG. 3 is a block diagram illustrating a configuration example of a merge vector/merge index determining unit 2720.

FIG. 3 is a block diagram illustrating a configuration example of the merge vector/merge index determining unit 2720. The merge vector/merge index determining unit 2720 illustrated in FIG. 3 includes a merge vector candidate list generating unit 2721 and a merge vector/index selecting unit 2722.

The merge vector candidate list generating unit 2721 includes a function of generating a list of motion vectors that are candidates of a merge vector from prediction encoding information of a spatial neighborhood block or prediction encoding information of a temporal neighborhood block. The spatial neighborhood block is, for example, a block adjacent to an encoding target block. The temporal neighborhood block is, for example, a block located at the same position as that of an encoding target block in another frame.

The merge vector/index selecting unit 2722 calculates, on the basis of a current image and a reference image, an evaluation cost with respect to each merge vector candidate included in the list generated by the merge vector candidate list generating unit 2721. The merge vector/index selecting unit 2722 selects a merge vector in which the calculated evaluation cost is minimum and selects an index of the selected merge vector. The merge vector/index selecting unit 2722 outputs merge information including the selected merge vector and merge index, and an evaluation cost for the selected merge vector.

[Description of Operations]

Figure 4:
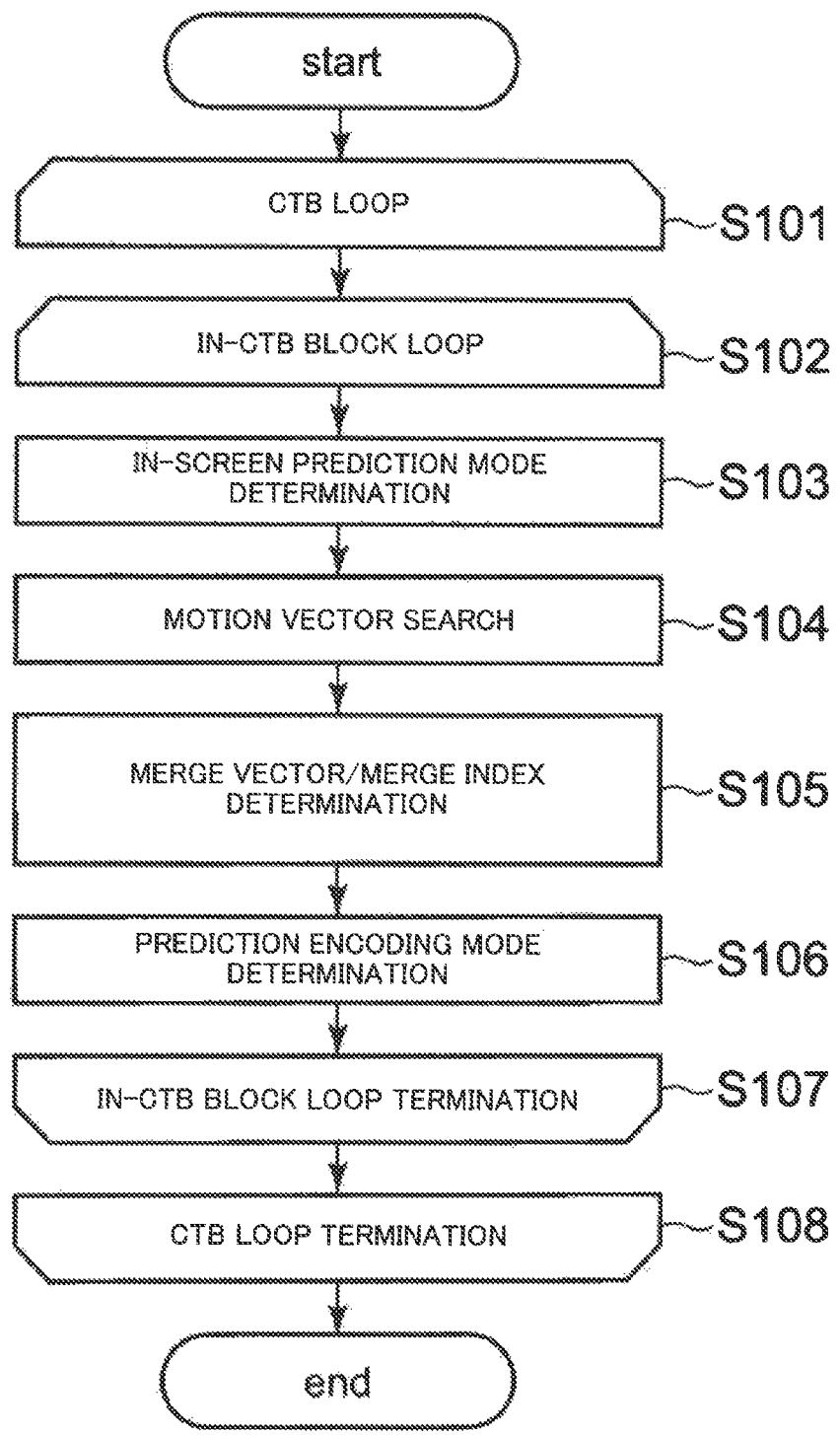
FIG. 4 is a flowchart illustrating an operation of prediction encoding mode determination processing by the prediction encoding information determining unit 2700 of the first example embodiment.

An operation of the prediction encoding information determining unit 2700 of the present example embodiment will be described with reference to FIGS. 4 to 6. FIG. 4 is a flowchart illustrating an operation of prediction encoding mode determination processing by the prediction encoding information determining unit 2700 of the first example embodiment.

The example illustrated in FIG. 4 is an operation example in which in-screen prediction mode determination processing, motion vector search processing, merge vector/merge index determination processing, and prediction encoding mode determination processing are sequentially executed for one encoding target block in each CTB.

The prediction encoding information determining unit 2700 receives one CTB that is not processed yet among CTBs included in an input image. In other words, the processing enters into a CTB loop (step S101).

The prediction encoding information determining unit 2700 selects one block in which a prediction encoding mode is not determined yet among blocks in the input CTB. In other words, the processing enters into an in-CTB block loop (step S102).

The in-screen prediction mode determining unit 2730 determines an in-screen prediction mode having a minimum cost for the selected block (step S103).

The motion vector search unit 2710 then determines, for the selected block, a tentative motion vector having a minimum cost from among a large number of motion vector candidates in a search range (step S104).

The merge vector/merge index determining unit 2720 then determines, for the selected block, a merge vector having a minimum cost among a plurality of merge vector candidates derived from motion vectors of neighborhood blocks. The merge vector/merge index determining unit 2720 determines a merge index corresponding to the determined merge vector (step S105).

The prediction encoding mode determining unit 2740 then determines a prediction encoding mode of the selected block, on the basis of information input from the in-screen prediction mode determining unit 2730, the motion vector search unit 2710, and the merge vector/merge index determining unit 2720 (step S106).

The prediction encoding information determining unit 2700 repeatedly executes the processing of steps S103 to S106 while there is a block in which a prediction encoding mode is not determined among blocks in the input CTB. When prediction encoding modes of all the blocks in the CTB is determined, the prediction encoding information determining unit 2700 exits from the in-CTB block loop (step S107).

The prediction encoding information determining unit 2700 repeatedly executes the processing of steps S102 to S107 while there is an unprocessed CTB among the CTBs included in the input image. When all the CTBs included in the input image is processed, the prediction encoding information determining unit 2700 exits from the CTB loop (step S108) and ends the prediction encoding mode determination processing.

Next, another operation example of the prediction encoding mode determination processing by the prediction encoding information determining unit 2700 will be described. FIG. 5 is a flowchart illustrating another operation of the prediction encoding mode determination processing by the prediction encoding information determining unit 2700 of the first example embodiment.

Figure 5:
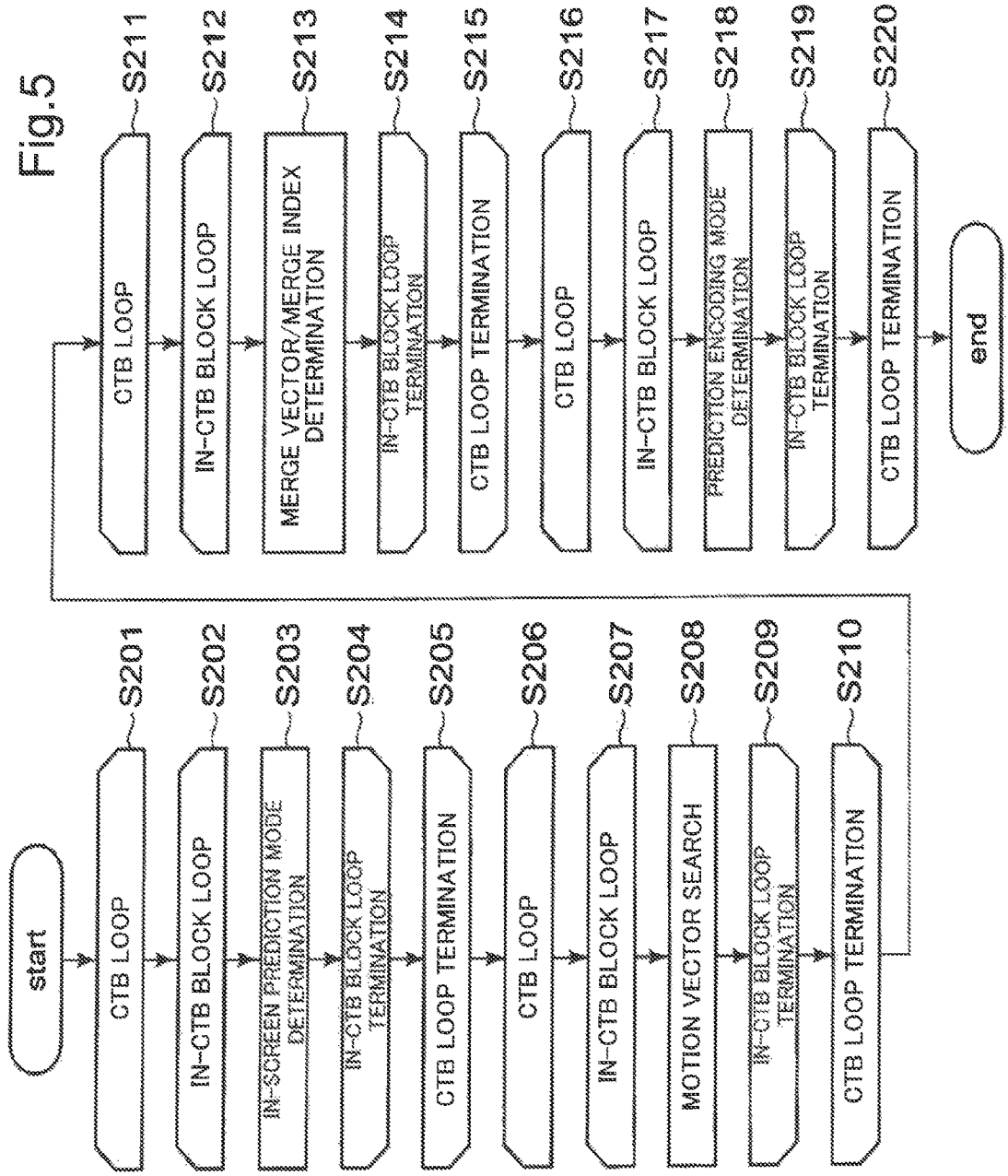
FIG. 5 is a flowchart illustrating another operation of prediction encoding mode determination processing by the prediction encoding information determining unit 2700 of the first example embodiment.

The example illustrated in FIG. 5 is an operation example in which in-screen prediction mode determination processing, motion vector search processing, merge vector/merge index determination processing, and prediction encoding mode determination processing are sequentially executed for one input image.

The in-screen prediction mode determining unit 2730 receives one CTB that is not processed yet among CTBs included in an input image. In other words, the processing enters into a CTB loop (step S201). The in-screen prediction mode determining unit 2730 selects one block in which an in-screen prediction mode is not determined yet among blocks in the input CTB. In other words, the processing enters into an in-CTB block loop (step S202).

Processing of step S203 is similar to the processing of step S103 illustrated in FIG. 4. The in-screen prediction mode determining unit 2730 repeatedly executes the processing of step S203 while there is a block in which an in-screen prediction mode is not determined among blocks in the input CTB.

When in-screen prediction modes of all the blocks in the CTB are determined, the in-screen prediction mode determining unit 2730 exits from the in-CTB block loop (step S204). The in-screen prediction mode determining unit 2730 repeatedly executes the processing of steps S202 to S204 while there is a CTB that is not processed among the CTBs included in the input image. When all the CTBs included in the input image are processed, the in-screen prediction mode determining unit 2730 exits from the CTB loop (step S205).

The motion vector search unit 2710 then receives one CTB that is not processed yet among the CTBs included in the input image. In other words, the processing enters into a CTB loop (step S206). The motion vector search unit 2710 selects one block in which a tentative motion vector is not determined yet among blocks in the input CTB. In other words, the processing enters into an in-CTB block loop (step S207).

Processing of step S208 is similar to the processing of step S104 illustrated in FIG. 4. The motion vector search unit 2710 repeatedly executes the processing of step S208 while there is a block in which a tentative motion vector is not determined among blocks in the input CTB.

When tentative motion vectors are determined for all the blocks in the CTB, the motion vector search unit 2710 exits from the in-CTB block loop (step S209). The motion vector search unit 2710 repeatedly executes the processing of steps S207 to S209 while there is a CTB that is not processed among the CTBs included in the input image. When all the CTBs included in the input image are processed, the motion vector search unit 2710 exits from the CTB loop (step S210).

The merge vector/merge index determining unit 2720 then receives one CTB that is not processed yet among the CTBs included in the input image. In other words, the processing enters into a CTB loop (step S211). The merge vector/merge index determining unit 2720 selects one block in which either of a merge vector or a merge index is not determined yet among blocks in the input CTB. In other words, the processing enters into an in-CTB block loop (step S212).

Processing of step S213 is similar to the processing of step S105 illustrated in FIG. 4. The merge vector/merge index determining unit 2720 repeatedly executes the processing of step S213 while there is a block in which either of a merge vector or a merge index is not determined among blocks in the input CTB.

When merge vectors and merge indexes are determined for all the blocks in the CTB, the merge vector/merge index determining unit 2720 exits from the in-CTB block loop (step S214). The merge vector/merge index determining unit 2720 repeatedly executes the processing of steps S212 to S214 while there is a CTB that is not processed among the CTBs included in the input image. When all the CTBs included in the input image are processed, the merge vector/merge index determining unit 2720 exits from the CTB loop (step S215).

The prediction encoding mode determining unit 2740 then receives one CTB that is not processed yet among the CTBs included in the input image. In other words, the processing enters into a CTB loop (step S216). The prediction encoding mode determining unit 2740 selects one block in which a prediction encoding mode is not determined yet among blocks in the input CTB. In other words, the processing enters into an in-CTB block loop (step S217).

Processing of step S218 is similar to the processing of step S106 illustrated in FIG. 4. The prediction encoding mode determining unit 2740 repeatedly executes the processing of step S218 while there is a block in which a prediction encoding mode is not determined among blocks in the input CTB.

When prediction encoding modes of all the blocks in the CTB are determined, the prediction encoding mode determining unit 2740 exits from the in-CTB block loop (step S219). The prediction encoding mode determining unit 2740 repeatedly executes the processing of steps S217 to S219 while there is a CTB that is not processed among the CTBs included in the input image. When all the CTBs included in the input image are processed, the prediction encoding mode determining unit 2740 exits from the CTB loop (step S220) and ends the prediction encoding mode determination processing.

Processing pieces, i.e. pieces of processing, each being for the CTBs in each of motion vector search processing, merge vector/merge index determination processing, and prediction encoding mode determination processing are processing independent of each other, and therefore processing pieces each being for CTBs may be executed in parallel. In other words, the prediction encoding information determining unit 2700 may execute processing of the CTB loops illustrated in FIG. 4 and FIG. 5 as processing pieces each being for CTBs in parallel.

Next, an operation example of merge vector candidate list generation processing by the merge vector candidate list generating unit 2721 will be described. FIG. 6 is a flowchart illustrating an operation of merge vector candidate list generation processing by the merge vector candidate list generating unit 2721. The processing illustrated in FIG. 6 corresponds to a part of the processing of step S105 illustrated in FIG. 4 or a part of the processing of step S213 illustrated in FIG. 5.

Figure 16:
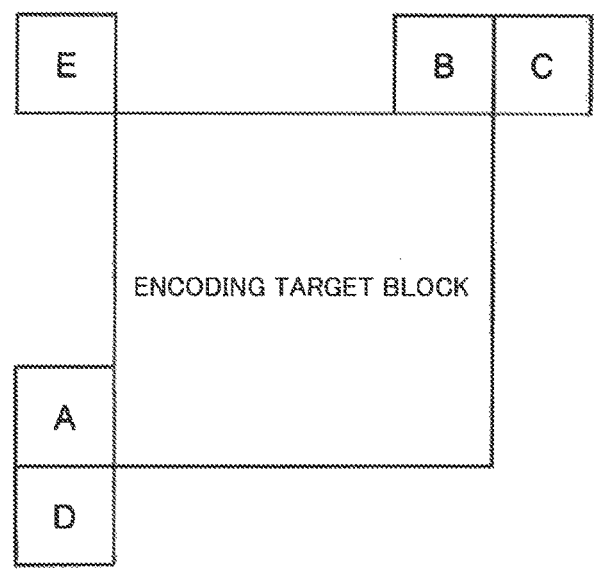
FIG. 16 is an illustrative diagram illustrating spatial neighborhood blocks of an encoding target block.

The merge vector candidate list generating unit 2721 sets, as candidate blocks, for example, blocks A, B, C, D, and E of a neighborhood of a processing target block illustrated in FIG. 16 and a block located at the same position as that of the processing target block in a temporal neighborhood frame. The merge vector candidate list generating unit 2721 selects one block that is not verified yet among the candidate blocks. In other words, the processing enters into a candidate block loop (step S301).

The merge vector candidate list generating unit 2721 confirms whether or not the selected candidate block exists in the same CTB as that of the processing target block (step S302).

When the selected candidate block does not exist in the same CTB (No in step S302), the merge vector candidate list generating unit 2721 does not add motion information of the selected candidate block to a merge vector candidate list. The merge vector candidate list generating unit 2721 ends the verification of the selected candidate block and selects a next candidate block (step S301).

When the selected candidate block exists in the same CTB (Yes in step S302), the merge vector candidate list generating unit 2721 confirms whether or not the selected candidate block is a valid block (step S303). A case in which the selected candidate block exists in the same CTB includes a case in which a frame to which a candidate block belongs and a frame to which a processing target block belongs are different.

The valid block is a block that exists in a screen and is not encoded in an in-screen prediction mode. The reason why a block that exists in a screen and is not encoded in an in-screen prediction mode is set as a valid block is that a block that exists outside the screen and a block encoded in an in-screen prediction mode do not have a motion vector.

When the selected candidate block is not a valid block (No in step S303), the merge vector candidate list generating unit 2721 does not add motion information of the selected candidate block to the merge vector candidate list. The merge vector candidate list generating unit 2721 ends the verification of the selected candidate block and selects a next candidate block (step S301).

When the selected candidate block is an valid block (Yes in step S303), the merge vector candidate list generating unit 2721 adds motion information of the selected candidate block to the merge vector candidate list as a merge vector candidate (step S304).

The merge vector candidate list generating unit 2721 then confirms whether or not the number of merge vector candidates in the merge vector candidate list is a maximum merge candidate number (step S305). When the number of merge vector candidates is a maximum merge candidate number (Yes in step S305), the merge vector candidate list generating unit 2721 exits from the candidate block loop and ends the merge vector candidate list generation processing.

When the number of merge vector candidates is not the maximum merge candidate number (No in step S305), the merge vector candidate list generating unit 2721 selects a next candidate block (step S301).

The merge vector candidate list generating unit 2721 repeatedly executes the processing of steps S302 to S305 while there is a candidate block that is not verified among the candidate blocks. When all the candidate blocks are verified, the merge vector candidate list generating unit 2721 exits from the candidate block loop (step S306) and ends the merge vector candidate list generation processing.

Figure 6:
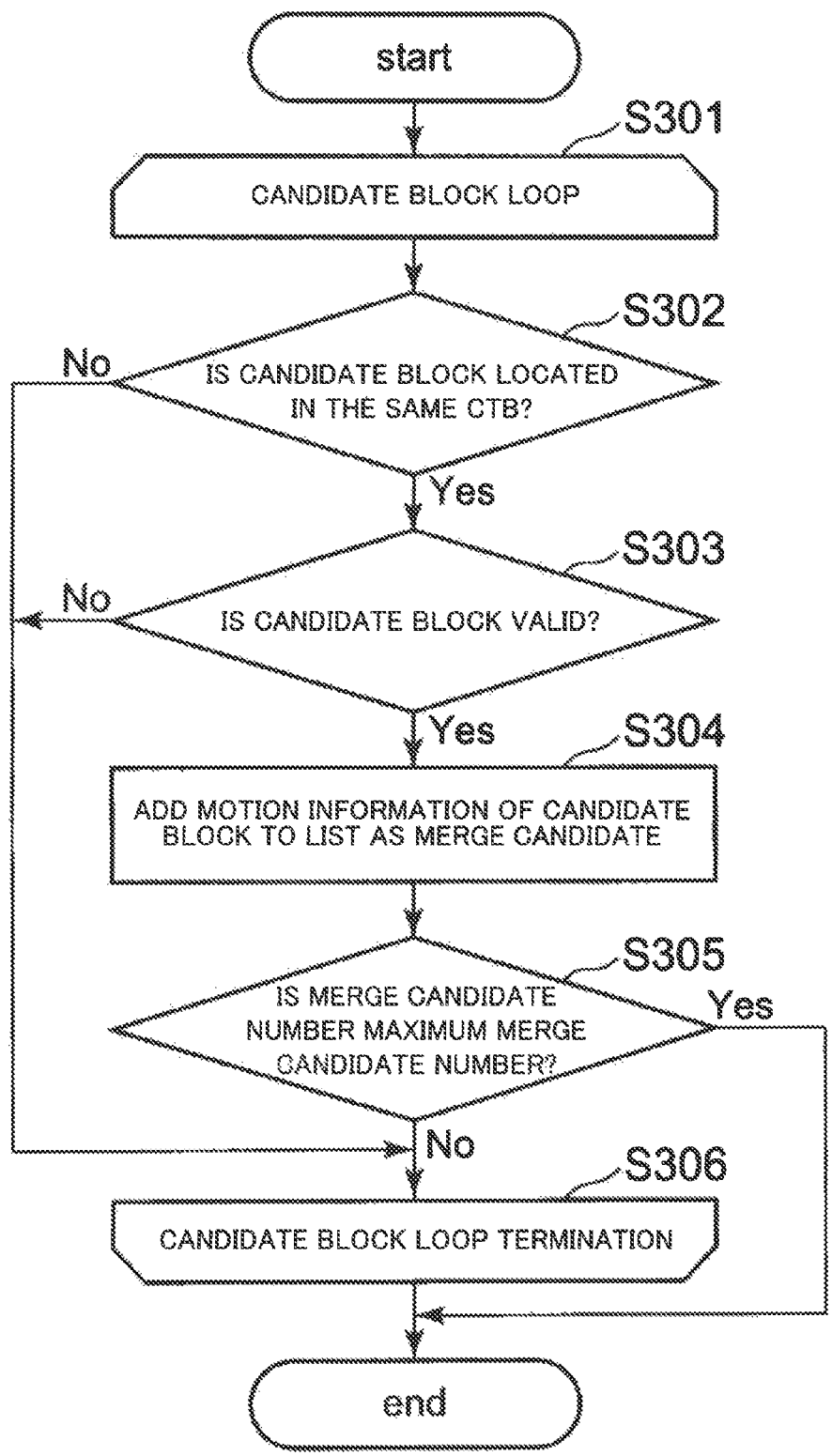
FIG. 6 is a flowchart illustrating an operation of merge vector candidate list generation processing by a merge vector candidate list generating unit 2721.

The merge vector candidate list generating unit of the present example embodiment determines whether or not there is a candidate block in the same CTB as that of an encoding target block in the processing of step S302 illustrated in FIG. 6. The merge vector candidate list generating unit adds only motion information of a candidate block that exists in the same CTB to a list as a merge vector candidate, and therefore does not need prediction encoding information of a candidate block that exists in another CTB.

A common merge vector candidate list generating unit adds also motion information of a candidate block that exists outside the same CTB to a list as a merge vector candidate, and therefore motion information of a block that exists in another CTB also needs to have been determined at the time of addition. Therefore, there is a dependence relation among processing pieces for CTBs and the processing pieces are not executed in parallel. The merge vector/merge index determining unit 2720 of the present example embodiment does not refer to prediction encoding information of a candidate block that exists in another CTB, and therefore processing pieces for CTBs can be executed in parallel.

When, for example, an image of a 4K (3840×2160) size is divided into CTUs of a 64×64 size, the motion picture encoding device of the present example embodiment can process 3840×2160/64×64=2025 tasks in parallel.

Therefore, when the motion picture encoding device of the present example embodiment is implemented by using a many core processor, a larger number of processor cores are used and therefore a processing time for encoding processing is shortened. Motion information of a candidate block in a CTB is used in a way similar to a way of using by a common motion picture encoding device, and therefore a decrease in encoding efficiency is suppressed. The motion picture encoding device of the present example embodiment can process a large number of tasks in parallel while suppressing a decrease in encoding efficiency, and therefore encoding processing can be executed at high speed.

Further, when a motion picture stream output by the motion picture encoding device of the present example embodiment is decoded, prediction encoding modes of CTBs are also determined in parallel. The reason is that it is unnecessary to refer to information of another CTB during decoding, i.e. it is guaranteed that there is no dependence relation among CTBs.

Second Example Embodiment

[Description of Configurations]

Next, a second example embodiment of the present invention will be described with reference to drawings. A configuration of a motion picture encoding device 1000 of the present example embodiment is similar to the configuration of the motion picture encoding device 1000 illustrated in FIG. 1. The motion picture encoding device 1000 of the present example embodiment derives a merge index conforming to the H.265 standards.

Figure 7:
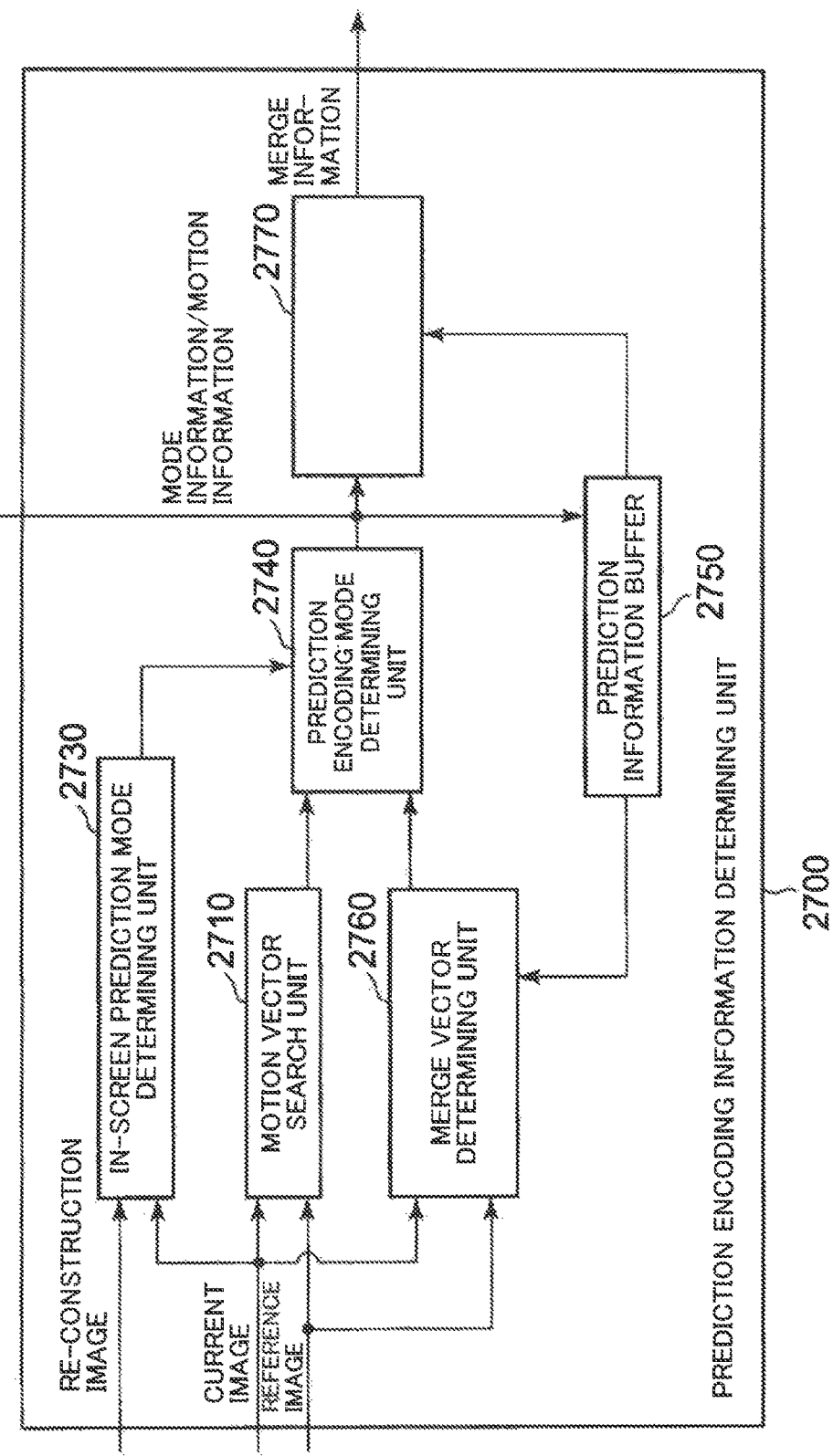
FIG. 7 is a block diagram illustrating a configuration example of a prediction encoding information determining unit 2700 of a second example embodiment.

A configuration of a prediction encoding information determining unit 2700 in the motion picture encoding device of the present example embodiment is illustrated in FIG. 7. FIG. 7 is a block diagram illustrating a configuration example of the prediction encoding information determining unit 2700 of the second example embodiment.

As illustrated in FIG. 7, the prediction encoding information determining unit 2700 of the present example embodiment is different from the prediction encoding information determining unit 2700 illustrated in FIG. 2 in a point that a merge vector determining unit 2760 and a merge index determining unit 2770 are included instead of the merge vector/merge index determining unit 2720.

A configuration of the prediction encoding information determining unit 2700 illustrated in FIG. 7 except the merge vector determining unit 2760 and the merge index determining unit 2770 is similar to the configuration of the prediction encoding information determining unit 2700 illustrated in FIG. 2. A prediction encoding mode determining unit 2740 of the present example embodiment includes a function different from that of the prediction encoding mode determining unit 2740 of the first example embodiment.

The merge vector determining unit 2760 includes a function of determining a merge vector having a minimum cost from among a plurality of merge vector candidates derived from motion vectors of neighborhood blocks by executing block matching or the like. The merge vector determining unit 2760 does not refer to a block outside a CTB to which an encoding target block belongs when generating a merge vector candidate list.

The prediction encoding mode determining unit 2740 determines, on the basis of input information, which prediction mode of an in-screen prediction mode and a motion compensation prediction mode is used as a prediction encoding mode of an encoding target block.

The prediction encoding mode determining unit 2740 outputs the determined mode information. When the prediction encoding mode is determined as a motion compensation prediction mode, the prediction encoding mode determining unit 2740 outputs only a motion vector and does not determine merge information. The mode information output from the prediction encoding mode determining unit 2740 is input to the merge index determining unit 2770.

The merge index determining unit 2770 includes a function of determining, on the basis of the input mode information, merge indexes related to a plurality of merge vector candidates derived from motion vectors of neighborhood blocks. The merge index determining unit 2770 refers to a block outside a CTB to which an encoding target block belongs when generating a merge vector candidate list.

Figure 8:
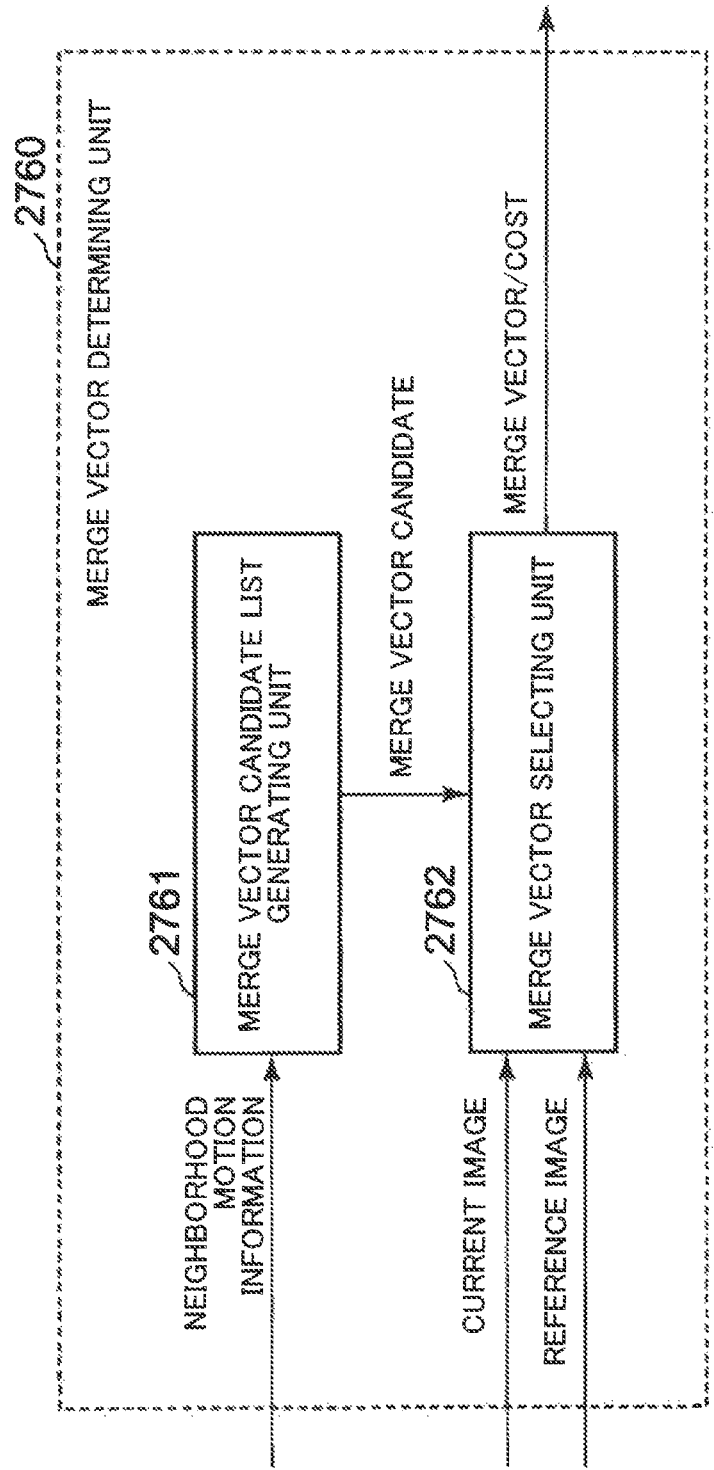
FIG. 8 is a block diagram illustrating a configuration example of a merge vector determining unit 2760.

A configuration example of the merge vector determining unit 2760 is illustrated in FIG. 8. FIG. 8 is a block diagram illustrating a configuration example of the merge vector determining unit 2760. The merge vector determining unit 2760 illustrated in FIG. 8 includes a merge vector candidate list generating unit 2761 and a merge vector selecting unit 2762.

The merge vector candidate list generating unit 2761 includes a function similar to that of the merge vector candidate list generating unit 2721 illustrated in FIG. 3.

The merge vector selecting unit 2762 calculates, on the basis of a current image and a reference image, evaluation costs for merge vector candidates included in a list generated by the merge vector candidate list generating unit 2761. The merge vector selecting unit 2762 selects a merge vector in which the calculated evaluation cost is minimum and outputs the selected merge vector and an evaluation cost for the merge vector. In other words, the merge vector selecting unit 2762 does not output a merge index, differently from the merge vector/index selecting unit 2722.

Figure 9:
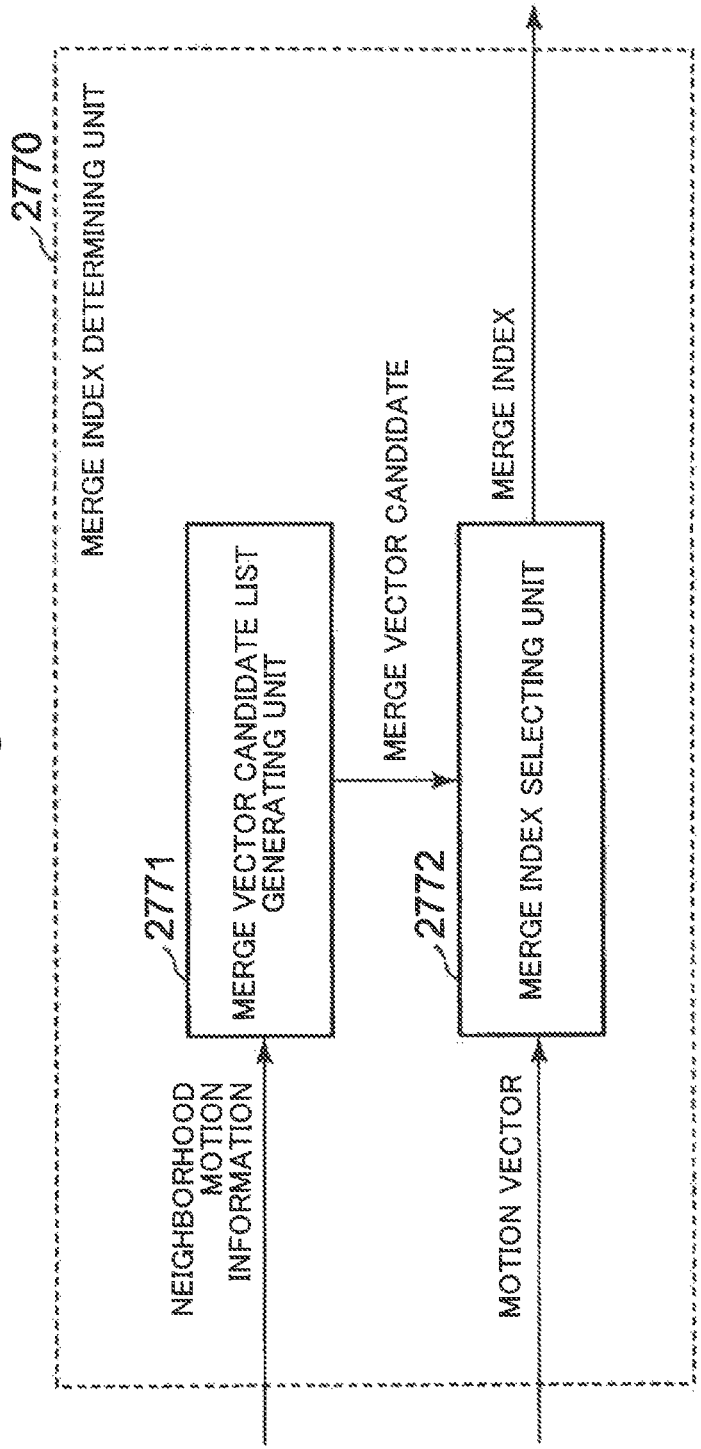
FIG. 9 is a block diagram illustrating a configuration example of a merge index determining unit 2770.

Next, a configuration example of the merge index determining unit 2770 is illustrated in FIG. 9. FIG. 9 is a block diagram illustrating a configuration example of the merge index determining unit 2770. The merge index determining unit 2770 illustrated in FIG. 9 includes a merge vector candidate list generating unit 2771 and a merge index selecting unit 2772.

The merge vector candidate list generating unit 2771 includes a function of generating a list of motion vectors that are candidates of a merge vector from prediction encoding information of spatial neighborhood blocks or prediction encoding information of temporal neighborhood blocks. The merge vector candidate list generating unit 2771 does not confirm whether or not there is a neighborhood block in the same CTB as that of a processing target block when generating the list.

The merge index selecting unit 2772 includes a function of selecting merge indexes related to the list generated by the merge vector candidate list generating unit 2771. When selecting merge indexes, the merge index selecting unit 2772 uses mode information input from the prediction encoding mode determining unit 2740. The merge index selecting unit 2772 outputs the selected merge indexes.

[Description of Operations]

Figure 10:
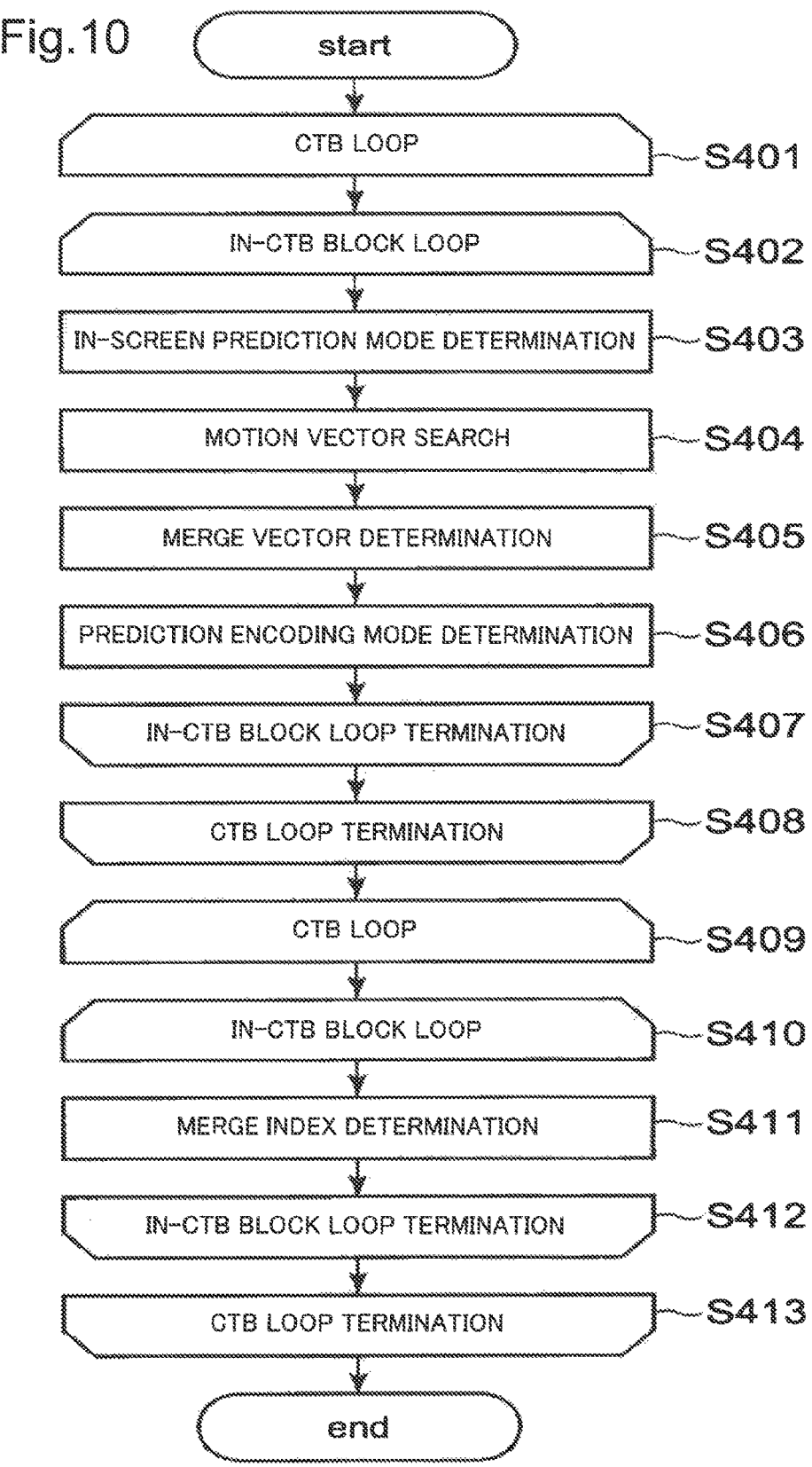
FIG. 10 is a flowchart illustrating an operation of prediction encoding mode determination processing by the prediction encoding information determining unit 2700 of the second example embodiment.

An operation of the prediction encoding information determining unit 2700 of the present example embodiment will be described with reference to FIG. 10. FIG. 10 is a flowchart illustrating an operation of prediction encoding mode determination processing by the prediction encoding information determining unit 2700 of the second example embodiment.

The example illustrated in FIG. 10 is an operation example in which in-screen prediction mode determination processing, motion vector search processing, merge vector determination processing, and prediction encoding mode determination processing are sequentially executed for one encoding target block in each CTB, and thereafter merge index determination processing is executed for one encoding target block in each CTB.

Processing in steps S401 to S404 is similar to the processing of steps S101 to S104 illustrated in FIG. 4.

The merge vector determining unit 2760 determines, for a selected block, a merge vector having a minimum cost from among a plurality of merge vector candidates derived from motion vectors of neighborhood blocks (step S405).

Processing of steps S406 to S408 is similar to the processing of steps S106 to S108 illustrated in FIG. 4.

The merge index determining unit 2770 receives one CTB that is not processed yet among CTBs included in an input image. In other words, the processing enters into a CTB loop (step s409).

The merge index determining unit 2770 selects, on the basis of input merge information, one block for which a merge index is not determined yet among blocks for which a prediction encoding mode in the input CTB is determined to be a motion compensation prediction mode. In other words, the processing enters into an in-CTB block loop (step S410).

The merge vector candidate list generating unit 2771 generates, for the selected block, a merge vector candidate list including a plurality of merge vector candidates from motion vectors of neighborhood blocks. The merge index selecting unit 2772 then determines merge indexes related to the generated merge vector candidate list (step S411).

The merge index determining unit 2770 repeatedly executes the processing of step S411 while there is a block for which a merge index is not determined among blocks for which a prediction encoding mode in the input CTB is determined to be a motion compensation prediction mode. When merge indexes are determined for all the blocks for which a prediction encoding mode in the CTB is determined to be a motion compensation prediction mode, the merge index determining unit 2770 exits from the in-CTB block loop (step S412).

The merge index determining unit 2770 repeatedly executes the processing of steps S410 to S412 while there is an CTB that is not processed among the CTBs included in the input image. When all the CTBs included in the input image are processed, the merge index determining unit 2770 exits from the CTB loop (step S413) and ends the prediction encoding mode determination processing.

The prediction encoding information determining unit 2700 of the present example embodiment may execute, similarly to the example illustrated in FIG. 5, in-screen prediction mode determination processing, motion vector search processing, merge vector determination processing, prediction encoding mode determination processing, and merge index determination processing sequentially for one input image.

Processing pieces each being for CTBs in motion vector search processing, merge vector determination processing, and prediction encoding mode determination processing are independent with each other, and therefore the processing pieces each being for CTBs may be executed in parallel.

The merge index determining unit 2770 receives motion information and mode information of a block outside a CTB. In other words, after prediction encoding modes are determined for all the CTBs, the merge index determining unit 2770 can execute merge index determination processing as processing pieces each being for CTBs in parallel. In other words, the prediction encoding information determining unit 2700 may execute processing of a CTB loop illustrated in FIG. 10 as processing pieces each being for CTBs in parallel.

Figure 11:
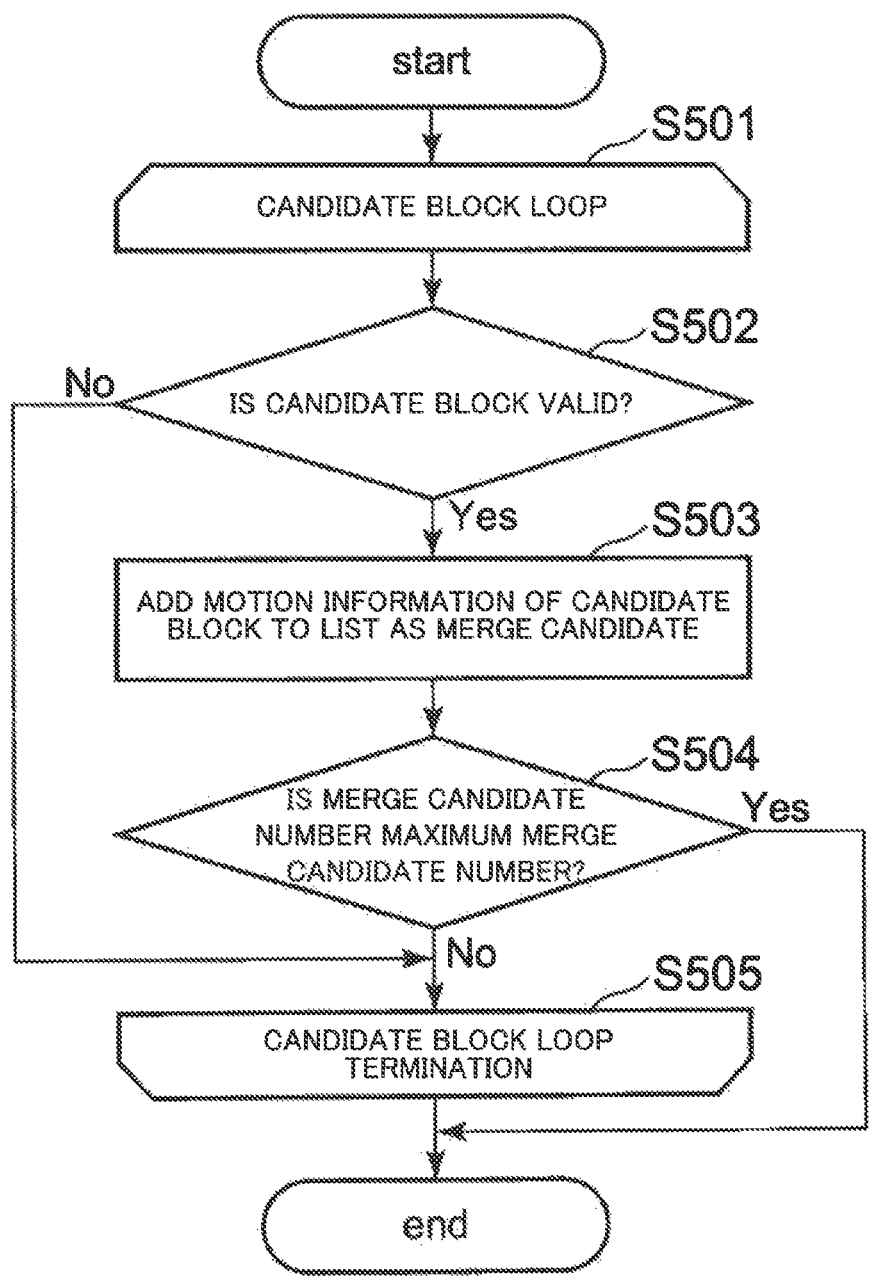
FIG. 11 is a flowchart illustrating an operation of merge vector candidate list generation processing by a merge vector candidate list generating unit 2771.

Next, an operation example of merge vector candidate list generation processing by the merge vector candidate list generating unit 2771 will be described. FIG. 11 is a flowchart illustrating an operation of merge vector candidate list generation processing by the merge vector candidate list generating unit 2771. The processing illustrated in FIG. 11 corresponds to a part of the processing of step S411 illustrated in FIG. 10.

The merge vector candidate list generating unit 2771 adds also motion information of a block outside a CTB to which a processing target block belongs to a list as a merge vector candidate. In other words, in the operation example illustrated in FIG. 11, there is no processing of step S302 that confirms whether or not the selected candidate block illustrated in FIG. 6 exists in the same CTB as that including a processing target block.

Processing of step S501 is similar to the processing of step S301 illustrated in FIG. 6. Processing of steps S502 to S505 is similar to the processing of steps S303 to S306 illustrated in FIG. 6.

The merge vector candidate list generating unit 2771 sets also motion information of a block outside a CTB as a merge vector candidate, and therefore a generated merge vector candidate list is a list conforming to the H.265 standards. In the present example embodiment, motion information of a block outside a CTB is also used as a merge vector, and therefore it is possible to improve accuracy of encoding, compared with the first example embodiment.

Figure 12:
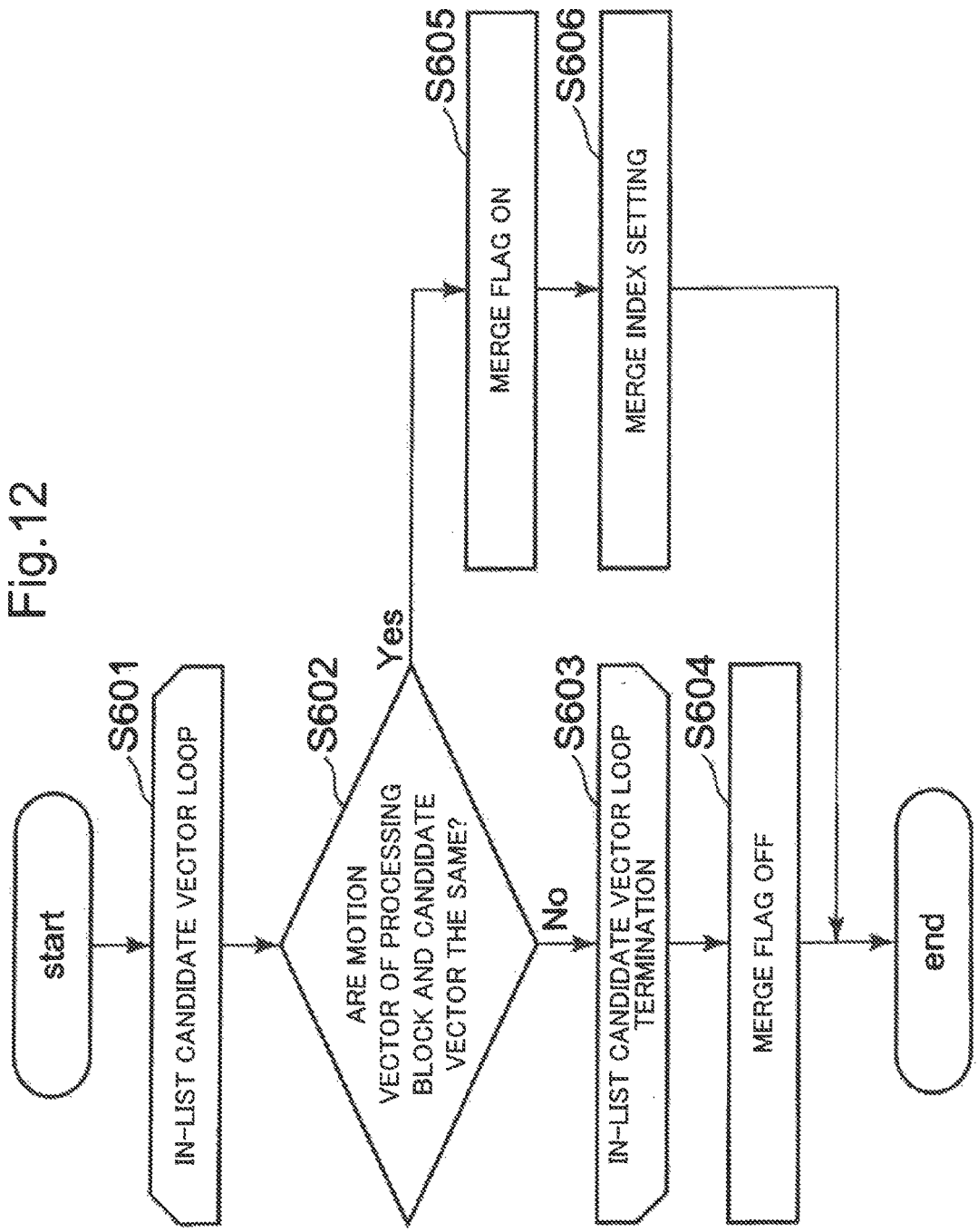
FIG. 12 is a flowchart illustrating an operation of merge index selection processing by a merge index selecting unit 2772.

Next, an operation example of merge index selection processing by the merge index selecting unit 2772 will be described. FIG. 12 is a flowchart illustrating an operation of merge index selection processing by the merge index selecting unit 2772. Processing illustrated in FIG. 12 corresponds to a part of the processing of step S411 illustrated in FIG. 10.

The merge index selecting unit 2772 selects one merge vector candidate that is not verified yet among merge vector candidates in a list generated by the merge vector candidate list generating unit 2771. In other words, the processing enters into an in-list candidate vector loop (step S601).

The merge index selecting unit 2772 confirms whether or not the selected merge vector candidate is the same as a motion vector, for a processing target block, input from the prediction encoding mode determining unit 2740 (step S602).

When the selected merge vector candidate is not the same as the motion vector for the processing target block (No in step S602), the merge index selecting unit 2772 ends the verification of the selected merge vector candidate and selects a next merge vector candidate (step S601).

When the selected merge vector candidate is the same as the motion vector for the processing target block (Yes in step S602), the merge index selecting unit 2772 exits from the in-list candidate vector loop. The merge index selecting unit 2772 sets a merge flag that is a flag indicating whether or not a prediction encoding mode of a processing target block is a merge mode to ON (step S605). The merge flag that is set to ON indicates that the prediction encoding mode is a merge mode.

In other words, even when the prediction encoding mode determined by the prediction encoding mode determining unit 2740 is a prediction vector mode, the merge index selecting unit 2772 sets a merge flag to ON when the motion vector for the processing target block is the same as a merge vector candidate. When the merge flag is set to ON, the prediction encoding mode is corrected and thereby the prediction encoding mode that is a prediction vector mode changes into a merge mode.

The merge index selecting unit 2772 then sets an index of the list as a merge index (step S606). Since motion information of a block outside the CTB is also included, the set merge index is a merge index conforming to the H.265 standards. After setting, the merge index selecting unit 2772 ends the merge index selection processing.

The merge index selecting unit 2772 repeatedly executes the processing of step S602 while there is a merge vector candidate that is not verified among the merge vector candidates. When all the merge vector candidates are verified and as a result, the same merge vector candidate as the motion vector for the processing target block does not exist in the list, the merge index selecting unit 2772 exits from the in-list candidate vector loop (step S603).

The merge index selecting unit 2772 sets the merge flag to OFF (step S604). The merge flag that is set to OFF indicates that the prediction encoding mode is not a merge mode. After setting, the merge index selecting unit 2772 ends the merge index selection processing.

In the present example embodiment, after a prediction encoding mode of each encoding target block is determined, the merge index determining unit 2770 sets again merge indexes conforming to the H.265 standards. Therefore, if conforming to the H.265 standards, even a decoder that is not a dedicated decoder can decode a bit stream output by the motion picture encoding device of the present example embodiment.

Third Example Embodiment
[Description of Configurations]

A third example embodiment of the present invention will be described with reference to drawings. A configuration of a motion picture encoding device 1000 of the present example embodiment is similar to the configuration of the motion picture encoding device 1000 illustrated in FIG. 1. A configuration of a prediction encoding information determining unit 2700 in the motion picture encoding device of the present example embodiment is similar to the configuration of the prediction encoding information determining unit 2700 illustrated in FIG. 7.

The motion picture encoding device 1000 of the present example embodiment repeats merge mode determination processing and prediction encoding mode determination processing for a plurality of times, and thereby calculates motion information that is more accurate than those of the first example embodiment and the second example embodiment and improves encoding efficiency.

A merge vector candidate list generating unit 2761 of the present example embodiment sets also motion information of a block outside a CTB to which a processing target block belongs as a merge vector candidate when generating a merge vector candidate list.

[Description of Operations]

Figure 13:
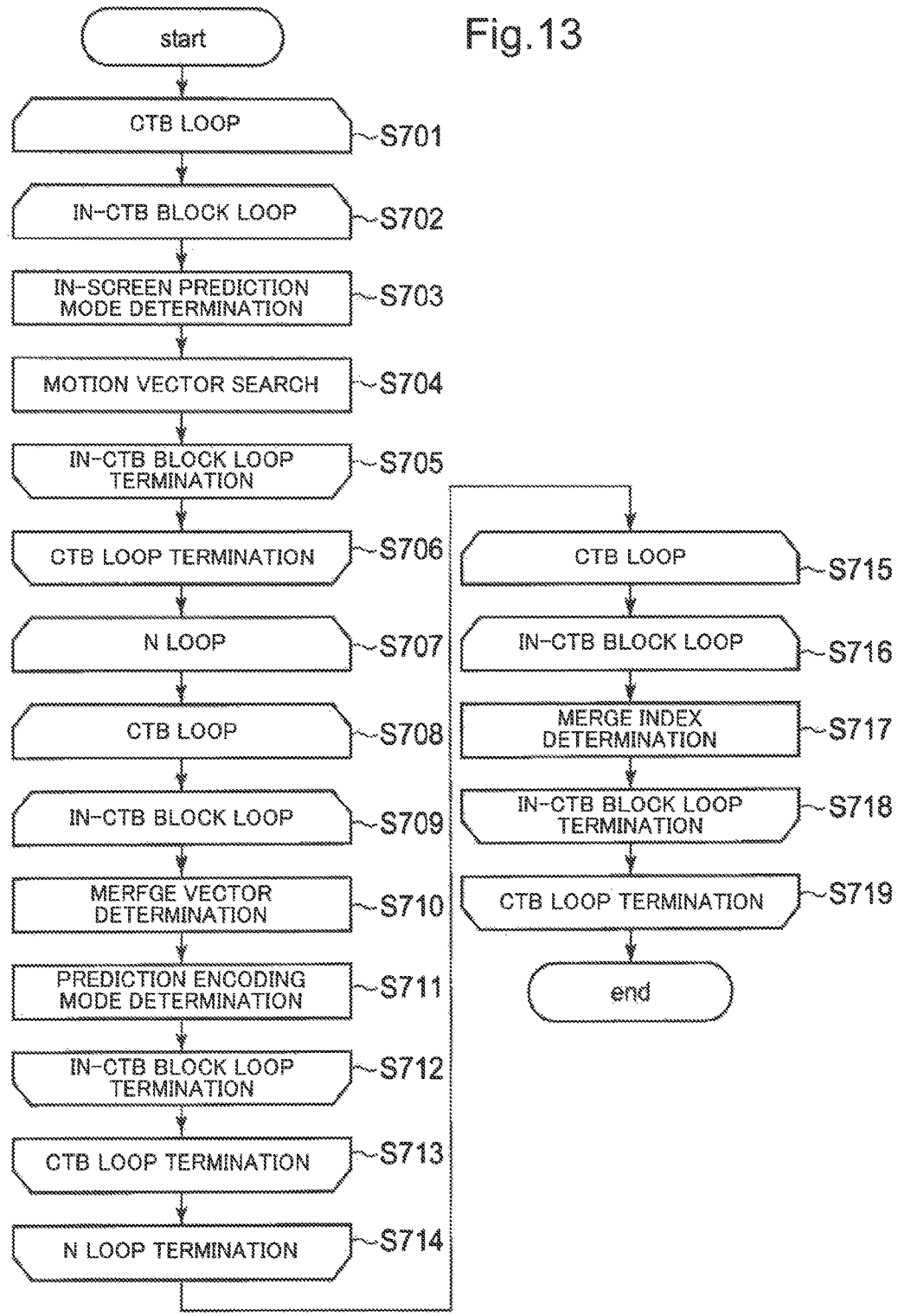
FIG. 13 is a flowchart illustrating an operation of prediction encoding mode determination processing by a prediction encoding information determining unit 2700 of a third example embodiment.

An operation of the prediction encoding information determining unit 2700 of the present example embodiment will be described with reference to FIG. 13. FIG. 13 is a flowchart illustrating an operation of prediction encoding mode determination processing by the prediction encoding information determining unit 2700 of the third example embodiment.

The prediction encoding information determining unit 2700 receives one CTB that is not processed yet among CTBs included in an input image. In other words, the processing enters into a CTB loop (step S701). The prediction encoding information determining unit 2700 selects one block for which an in-screen prediction mode and a tentative motion vector are not determined yet among blocks in the input CTB. In other words, the processing enters into an in-CTB block loop (step S702).

Processing of steps S703 to S704 is similar to the processing of steps S403 to S404 illustrated in FIG. 10.

The prediction encoding information determining unit 2700 repeatedly executes the processing of steps S703 to S704 while there is a block for which either of an in-screen prediction mode or a tentative motion vector is not determined among the blocks in the input CTB. When in-screen prediction modes and tentative motion vectors are determined for all the blocks in the CTB, the prediction encoding information determining unit 2700 exits from the in-CTB block loop (step S705).

The prediction encoding information determining unit 2700 repeatedly executes the processing of steps S702 to S705 while there is a CTB that is not processed among the CTBs included in the input image. When all the CTBs included in the input image are processed, the prediction encoding information determining unit 2700 exits from the CTB loop (step S706).

Then, the prediction encoding information determining unit 2700 enters an N loop (step S707). N is an integer equal to or more than 1. A loop number of times of the prediction encoding information determining unit 2700 in the N loop is designated as n.

The prediction encoding information determining unit 2700 then receives one CTB that is not processed yet among the CTBs included in the input image. In other words, the processing enters into a CTB loop (step S708). The prediction encoding information determining unit 2700 selects one block for which either of a merge vector or a prediction encoding mode is not determined yet among blocks in the input CTB. In other words, the processing enters into an in-CTB block loop (step S709).

The merge vector determining unit 2760 determines, for the selected block, a merge vector having a minimum cost among a plurality of merge vector candidates derived from motion vectors of neighborhood blocks (step S710).

An operation of merge vector candidate list generation by the merge vector candidate list generating unit 2761 is similar to the operation illustrated in FIG. 11. When n=1, there is no motion information that is of a neighborhood block outside a CTB and is input to the merge vector candidate list generating unit 2761. When n=1, motion information that is of a neighborhood block outside a CTB and is input to the merge vector candidate list generating unit 2761 is motion information output by the motion vector search unit 2710.

When n≥2, motion information that is of a neighborhood block outside a CTB and is input to the merge vector candidate list generating unit 2761 is motion information included in prediction encoding mode information output by the prediction encoding mode determining unit 2740 at the time of (n−1).

Processing of step S711 is similar to the processing of step S406 illustrated in FIG. 10.

The prediction encoding information determining unit 2700 repeatedly executes the processing of steps S710 to S711 while there is a block for which either of a merge vector or a prediction encoding mode is not determined among the blocks in the input CTB. When merge vectors and prediction encoding modes are determined for all the blocks in the CTB, the prediction encoding information determining unit 2700 exits from the in-CTB block loop (step S712).

The prediction encoding information determining unit 2700 repeatedly executes the processing of steps S709 to S712 while there is a CTB that is not processed among the CTBs included in the input image. When all the CTBs included in the input image are processed, the prediction encoding information determining unit 2700 exits from the CTB loop (step S713) and adds 1 to n.

The prediction encoding information determining unit 2700 repeatedly executes the processing of steps S708 to S713 while n<N. When n=N, the prediction encoding information determining unit 2700 exits from the N loop (step S714).

Processing of steps S715 to S719 is similar to the processing of steps S409 to S413 illustrated in FIG. 10.

The prediction encoding information determining unit 2700 may execute processing pieces each being for CTBs in processing of a CTB loop illustrated in FIG. 13 in parallel.

The merge vector determining unit 2760 of the present example embodiment repeatedly executes merge vector determination processing. The prediction encoding mode determining unit 2740 repeatedly executes prediction encoding mode determination processing. Therefore, the merge vector determining unit 2760 can refer to also motion information of a neighborhood block outside a CTB to which a processing target block belongs, which is generated in previous prediction encoding mode determination processing. In other words, it is possible for the motion picture encoding device of the present example embodiment to improve accuracy of motion information and increase encoding efficiency, compared with the first example embodiment and the second example embodiment.

Similarly to the second example embodiment, also in the present example embodiment, the prediction encoding mode determining unit 2740 determines a prediction encoding mode at a predetermined number-th time, and thereafter the merge index determining unit 2770 sets again a merge index conforming to the H.265 standards. Therefore, even a decoder, if conforming to the H.265 standards, that is not a dedicated decoder can decode a bit stream output by the motion picture encoding device of the present example embodiment.

In the example embodiments, processing of referring to information of a neighborhood block by a merge vector candidate list generating unit is described. A motion vector search unit (i.e. also in AMVP) may also execute processing of referring to information of a neighborhood block similarly to the merge vector candidate list generating unit.

In the example embodiments, a merge vector candidate list generating unit can refer to only a block in a CTB to which a processing target block belongs at the time of list generation, but a region that the merge vector candidate list generating unit can refer to is not limited to a CTB. Being a region to which a processing target block belongs, a region that the merge vector candidate list generating unit can refer to may be a region wider than a CTB and may be a region narrower than a CTB.

The example embodiments is able to be achieved by a configuration using hardware, and is also able to be achieved by using a computer program, for example, stored in a recording medium.

Figure 14:
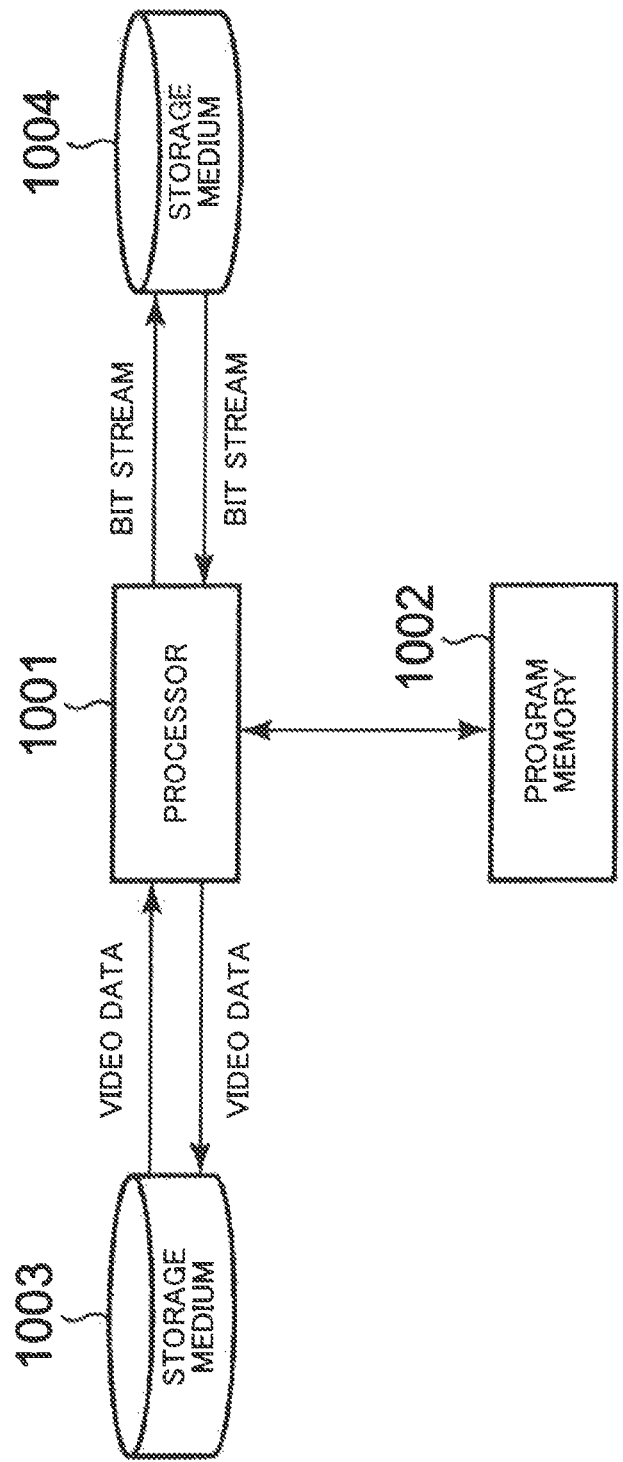
FIG. 14 is a block diagram illustrating a configuration example of an information processing device capable of achieving a function of the motion picture encoding device according to the present invention.

An information processing device illustrated in FIG. 14 includes a processor 1001, a program memory 1002, a storage medium (i.e. recording medium) 1003 for storing video data, and a storage medium 1004 for storing data such as a bit stream. The storage medium 1003 and the storage medium 1004 may be separate storage media or may be storage regions included in a same storage medium. A magnetic storage medium such as a hard disk can be used as the storage medium. In the storage medium 1003, at least a region where a program is stored is a non-transitory tangible medium.

In the information processing device illustrated in FIG. 14, the program memory 1002 stores a program for achieving a function of each block illustrated in FIG. 1. The processor 1001 executes processing in accordance with a program stored on the program memory 1002 and thereby achieves a function of the motion picture encoding device illustrated in FIG. 1.

Figure 15:
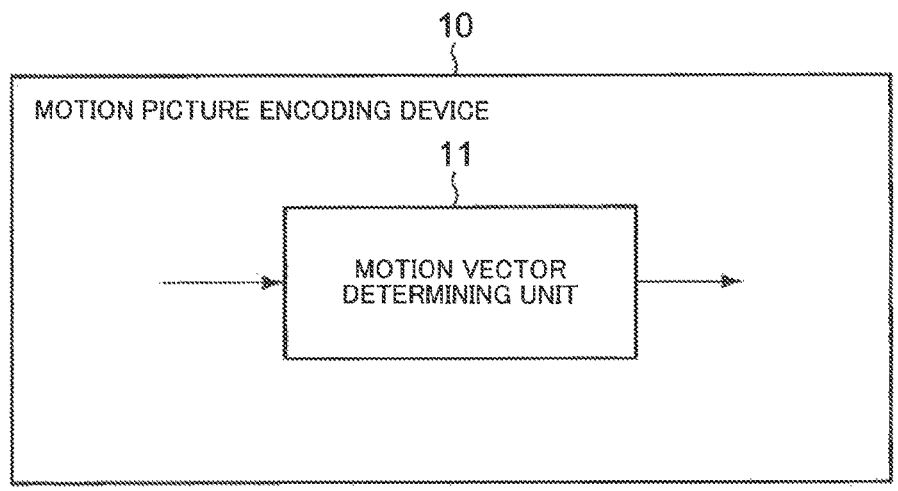
FIG. 15 is a block diagram illustrating an outline of the motion picture encoding device according to the present invention.

Next, an outline of the present invention will be described. FIG. 15 is a block diagram illustrating an outline of the motion picture encoding device according to the present invention. A motion picture encoding device 10 according to the present invention includes a motion vector determining unit 11 that determines a motion vector of an encoding target block used for motion compensation prediction among motion vectors of adjacent blocks included in a reference region including an encoding target block, the adjacent blocks being blocks adjacent to the encoding target block, the reference region being included in an image.

By such a configuration, the motion picture encoding device can process a large number of tasks in parallel without decreasing encoding efficiency.

Further, the motion vector determining unit 11 may include: a list generating unit (e.g. the merge vector candidate list generating unit 2721) that generates a merge vector candidate list for the encoding target block from motion vectors of adjacent blocks included in a reference region including an encoding target block; and a merge vector selecting unit (e.g. the merge vector selecting unit 2762) that selects a merge vector candidate having a minimum evaluation cost from the generated merge vector candidate list.

By such a configuration, the motion picture encoding device can execute in parallel generation processing of a merge vector candidate list in a merge mode and selection processing of a merge vector used for a motion compensation prediction.

Further, the motion vector determining unit 11 may include an index generating unit (e.g. the merge vector/merge index determining unit 2720) that generates an index corresponding to a merge vector candidate selected by a merge vector selecting unit.

By such a configuration, the motion picture encoding device can execute in parallel generation processing of merge indexes in a merge mode with respect to CTBs.

The motion vector determining unit 11 may further include a mode determining unit (e.g. the prediction encoding mode determining unit 2740) that determines a prediction encoding mode of an encoding target block by using an evaluation cost for a merge vector candidate selected by a merge vector selecting unit, and the motion picture encoding device 10 may include: a second list generating unit (e.g. the merge vector candidate list generating unit 2771) that generates a merge vector candidate list for an encoding target block from motion vectors of adjacent blocks of the encoding target block after prediction encoding modes and motion vectors of all the blocks included in the image are determined; and a second index generating unit (e.g. the merge index selecting unit 2772) that generates indexes corresponding to the generated merge vector candidate list.

By such a configuration, the motion picture encoding device can cope with both parallel execution of generation processing of a merge vector candidate list and selection processing of a merge vector with respect to CTBs and generation of a merge index conforming to the H.265 standards.

The motion picture encoding device 10 may further include: a third list generating unit (e.g. the merge vector candidate list generating unit 2761) that generates a merge vector candidate list for an encoding target block from motion vectors of adjacent blocks of the encoding target block after prediction encoding modes and motion vectors of all the blocks included in an image are determined; a second merge vector selecting unit (e.g. the merge vector selecting unit 2762) that selects a merge vector candidate having a minimum evaluation cost from the generated merge vector candidate list; and a second mode determining unit (e.g. the prediction encoding mode determining unit 2740) that determines a prediction encoding mode of the encoding target block by using an evaluation cost for the merge vector candidate selected by the second merge vector selecting unit, wherein the second mode determining unit may input a motion vector corresponding to the determined prediction encoding mode to the third list generating unit, the second list generating unit may generate a merge vector candidate list, based on a motion vector corresponding to a prediction encoding mode determined at a predetermined number-th time by the second mode determining unit, and the second index generating unit may generate an index, based on the prediction encoding mode determined at the predetermined number-th time by the second mode determining unit.

By such a configuration, the motion picture encoding device can cope with both parallel execution of generation processing of a highly accurate merge vector candidate list and selection processing of a highly accurate merge vector with respect to CTBs and generation of a highly accurate merge index conforming to the H.265 standards.

The motion vector determining unit 11 may include a motion vector search unit (e.g. the motion vector search unit 2710) that searches motion vectors of adjacent blocks included in a reference region including the encoding target block for a prediction motion vector for an encoding target block.

By such a configuration, the motion picture encoding device can execute pieces of prediction motion vector search processing in AMVP in parallel with respect to CTBs.

The motion picture encoding device 10 may further include an in-screen prediction mode determining unit (e.g. the in-screen prediction mode determining unit 2730) that determines an in-screen prediction mode, having a minimum cost, for the encoding target block from among a plurality of in-screen prediction modes.

A mode determining unit may determine a prediction encoding mode of the encoding target block by using an evaluation cost for a merge vector candidate selected by the merge vector selecting unit, an evaluation cost for a prediction motion vector for which the motion vector search unit searches, and an evaluation cost for an in-screen prediction mode determined by the in-screen prediction mode determining unit.

While the present invention has been described with reference to example embodiments thereof, the present invention is not limited to the example embodiments. The configuration and details of the present invention can be subjected to various modifications understood by those skilled in the art, without departing from the scope of the present invention.

INDUSTRIAL APPLICABILITY

The present invention can provide a high degree of parallelism of processing while maintaining encoding efficiency in encoding processing and achieve high-speed processing of a high-resolution video, and therefore is suitably applicable to an image-capture system, a transcode system, and the like that need high-resolution processing.

REFERENCE SIGNS LIST

10, 1000 Motion picture encoding device
11 Motion vector determining unit
1001 Processor
1002 Program memory
1003, 1004 Storage medium
1100 Transformation/quantization unit
1200 Subtraction unit
1210 Addition unit
1300 Encoding unit
1400 Inverse-transformation/inverse-quantization unit
1500 Loop filter
1600 Frame buffer
1700, 2700 Prediction encoding information determining unit
1710, 2710 Motion vector search unit
1720, 2720 Merge vector/merge index determining unit
1721, 2721 Merge vector candidate list generating unit
1722, 2722 Merge vector/index selecting unit
1730, 2730 In-screen prediction mode determining unit
1740, 2740 Prediction encoding mode determining unit
1750, 2750 Prediction information buffer
1800 In-screen predicting unit
1900 Motion compensation predicting unit
2760 Merge vector determining unit
2761, 2771 Merge vector candidate list generating unit
2762 Merge vector selecting unit
2770 Merge index determining unit
2772 Merge index selecting unit

The invention claimed is:

1. A motion picture encoding device comprising
a processor configured to operate as
a motion vector determining circuit that determines a motion vector of an encoding target block among motion vectors of adjacent blocks included in a reference region including the encoding target block, the motion vector being used for motion compensation prediction, the adjacent blocks being blocks adjacent to the encoding target block, the reference region being included in an image, wherein
the motion vector determining circuit includes:
a list generating circuit that generates a merge vector candidate list for the encoding target block from the motion vectors of the adjacent blocks included in the reference region including the encoding target block;
a merge vector selecting circuit that selects a merge vector candidate having a minimum evaluation cost from the generated merge vector candidate list; and
a mode determining circuit that determines a prediction encoding mode of the encoding target block by using an evaluation cost for the merge vector candidate selected by the merge vector selecting circuit, and
the processor is further configured to operate as:
a second list generating circuit that generates a merge vector candidate list for the encoding target block from the motion vectors of the adjacent blocks of the encoding target block after prediction encoding modes and motion vectors of all blocks included in the image are determined and a second index generating circuit that generates indexes corresponding to the generated merge vector candidate list generated by the second list generating circuit.

2. The motion picture encoding device according to claim 1, wherein the motion vector determining circuit includes an index generating circuit that generates an index corresponding to the merge vector candidate selected by the merge vector selecting circuit.

3. The motion picture encoding device according to claim 1, wherein the processor is further configured to operate as:

a third list generating circuit that generates a merge vector candidate list for the encoding target block from the motion vectors of the adjacent blocks of the encoding target block after the prediction encoding modes and the motion vectors of all the blocks included in the image are determined;

a second merge vector selecting circuit that selects a merge vector candidate having a minimum evaluation cost from the merge vector candidate list generated by the third list generating circuit; and a second mode determining circuit that determines a prediction encoding mode of the encoding target block by using an evaluation cost for the merge vector candidate selected by the second merge vector selecting circuit, wherein the second mode determining circuit inputs the motion vector corresponding to the determined prediction encoding mode to the third list generating circuit, the second list generating circuit generates the merge vector candidate list, based on the motion vector corresponding to the prediction encoding mode determined at a predetermined number-th time by the second mode determining circuit, and the second index generating circuit generates the index, based on the prediction encoding mode determined at the predetermined number-th time by the second mode determining circuit.

4. The motion picture encoding device according to claim 1, wherein the motion vector determining circuit includes a motion vector search circuit that searches the motion vectors of the adjacent blocks included in the reference region including the encoding target block for a prediction motion vector for the encoding target block.

5. A motion picture encoding method comprising by a motion vector determining circuit, determining a motion vector of an encoding target block among motion vectors of adjacent blocks included in a reference region including the encoding target block, the motion vector being used for motion compensation prediction, the adjacent blocks being blocks adjacent to the encoding target block, the reference region being included in an image, by a list generating circuit included in the motion vector determining circuit, generating a merge vector candidate list for the encoding target block from the motion vectors of the adjacent blocks included in the reference region including the encoding target block; and by a merge vector selecting circuit included in the motion vector determining circuit, selecting a merge vector candidate having a minimum evaluation cost from the generated merge vector candidate list, by a mode determining circuit included in the motion vector determining circuit determining a prediction encoding mode of the encoding target block by using an evaluation cost for the merge vector candidate selected by the merge vector selecting circuit, and by a second list generating circuit, generating a merge vector candidate list for the encoding target block from the motion vectors of the adjacent blocks of the encoding target block after prediction encoding modes and motion vectors of all blocks included in the image are determined; and by a second index generating circuit, generating indexes corresponding to the generated merge vector candidate list generated by the second list generating circuit.

6. A non-transitory computer readable storage medium storing a motion picture encoding program for causing a computer to execute by a motion vector determining circuit, determination processing of determining a motion vector of an encoding target block among motion vectors of adjacent blocks included in a reference region including the encoding target block, the motion vector being used for motion compensation prediction, the adjacent blocks being blocks adjacent to the encoding target block, the reference region being included in an image, by a list generating circuit included in the motion vector determining circuit, generation processing of generating a merge vector candidate list for the encoding target block from the motion vectors of the adjacent blocks included in the reference region including the encoding target block, by a merge vector selecting circuit included in the motion vector determining circuit, selection processing of selecting a merge vector candidate having a minimum evaluation cost from the generated merge vector candidate list, by a mode determining circuit included in the motion vector determining circuit, determining a prediction encoding mode of the encoding target block by using an evaluation cost for the merge vector candidate selected by the merge vector selecting circuit, by a second list generating circuit, generation processing of generating a merge vector candidate list for the encoding target block from the motion vectors of the adjacent blocks of the encoding target block after prediction encoding modes and motion vectors of all blocks included in the image are determined; and by a second index generating circuit, generating processing of generating indexes corresponding to the generated merge vector candidate list generated by the second list generating circuit.

* * * * *

UNITED STATES PATENT AND TRADEMARK OFFICE
CERTIFICATE OF CORRECTION

| | |
|---|---|
| PATENT NO. | : 10,462,479 B2 |
| APPLICATION NO. | : 15/742964 |
| DATED | : October 29, 2019 |
| INVENTOR(S) | : Fumiyo Takano |

It is certified that error appears in the above-identified patent and that said Letters Patent is hereby corrected as shown below:

In the Specification

Column 6, Summary of Invention, Line 48; Delete "proces sable" and insert --processable-- therefor Column 6, Summary of Invention, Line 61; Delete "64×4" and insert --64×64-- therefor Column 6, Summary of Invention, Line 64; Delete "proces sable" and insert --processable-- therefor Column 7, Summary of Invention, Line 16; Delete "proces sable" and insert --processable-- therefor Column 7, Summary of Invention, Line 19; Delete "proces sable" and insert --processable-- therefor Column 7, Summary of Invention, Line 35; Delete "proces sable" and insert --processable-- therefor Signed and Sealed this
Twenty-fourth Day of November, 2020

Andrei Iancu
*Director of the United States Patent and Trademark Office*